US010447175B2

(12) United States Patent
Friebe et al.

(10) Patent No.: US 10,447,175 B2
(45) Date of Patent: Oct. 15, 2019

(54) INVERTER AND CONTROL METHOD FOR AN INVERTER

(71) Applicant: SMA Solar Technology AG, Niestetal (DE)

(72) Inventors: Jens Friebe, Vellmar (DE); Oliver Prior, Marsberg (DE); Thomas Wappler, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/467,397

(22) Filed: Mar. 23, 2017

(65) Prior Publication Data

US 2017/0279374 A1 Sep. 28, 2017

(30) Foreign Application Priority Data

Mar. 24, 2016 (DE) .................. 10 2016 105 546

(51) Int. Cl.
*H02M 7/537* (2006.01)
*H02M 3/04* (2006.01)
(Continued)

(52) U.S. Cl.
CPC ............. *H02M 7/537* (2013.01); *H02J 3/383* (2013.01); *H02M 1/04* (2013.01); *H02M 1/12* (2013.01);
(Continued)

(58) Field of Classification Search
CPC ........... H02M 1/12; H02M 2001/0074; H02M 2001/123; H02M 2001/007;
(Continued)

(56) References Cited

U.S. PATENT DOCUMENTS 4,807,102 A 2/1989 Serras-Paulet
6,404,655 B1 * 6/2002 Welches .............. H02M 7/4807
363/17

(Continued)

FOREIGN PATENT DOCUMENTS

DE 102014101571 A1 8/2014
EP 0578548 A1 1/1994

OTHER PUBLICATIONS

"How to secure the quality of your mains supply. Planning and designing solutions for better power quality." Clean Grid Solutions Engineering Tomorrow. Darifoss, 44 pages.

*Primary Examiner* — Gustavo A Rosario-Benitez
(74) *Attorney, Agent, or Firm* — Eschweiler & Potashnik, LLC

(57) ABSTRACT

The disclosure relates to an inverter for supplying a power provided as a DC voltage at a DC input to an AC mains connectable to an AC output. In this case, the inverter includes a switching network with a plurality of semiconductor switches and a digital control unit for producing a digital switching pattern for digitally operated semiconductor switches of the switching network that are able to be used to produce a first output voltage ($U_{out,dig}$). The inverter additionally includes a linear control unit for producing signals for actuating at least one semiconductor switch of the switching network in a linear mode, wherein the linear control unit is set up to produce a voltage drop ($U_{out,lin}$) across and/or a current ($I_{out,lin}$) through the at least one linearly operated semiconductor switch to a target value that is dependent on an instantaneous difference between the first output voltage ($U_{out,dig}$) and a voltage ($U_{AC}$) of the AC mains. The disclosure additionally relates to a control method for such an inverter and a photovoltaic (PV) installation having such an inverter.

22 Claims, 12 Drawing Sheets

(51) Int. Cl.
*H02M 1/04* (2006.01)
*H02J 3/38* (2006.01)
*H02M 1/12* (2006.01)
*H02M 1/15* (2006.01)
*H02M 3/158* (2006.01)
*H02M 7/487* (2007.01)
*H02M 7/538* (2007.01)
*H02M 7/5387* (2007.01)
*H02M 1/14* (2006.01)
*H02M 1/00* (2006.01)

(52) U.S. Cl.
CPC ............... *H02M 1/15* (2013.01); *H02M 3/04* (2013.01); *H02M 3/158* (2013.01); *H02M 7/487* (2013.01); *H02M 7/538* (2013.01); *H02M 7/5387* (2013.01); *H02M 1/14* (2013.01); *H02M 2001/007* (2013.01); *H02M 2001/0009* (2013.01); *H02M 2001/0045* (2013.01)

(58) Field of Classification Search
CPC .... H02M 7/4807; H02M 7/4826; H02M 7/48; H02M 7/497; H02M 7/521; H02M 7/5387; H02M 7/53878; H02M 7/53871; H02M 7/539; H02M 7/537; H02M 1/04; H02M 1/15; H02M 3/04; H02M 3/15; H02J 3/383
See application file for complete search history.

(56) References Cited

U.S. PATENT DOCUMENTS

| | | | |
|---|---|---|---|
| 2001/0045863 A1* | 11/2001 | Pelly | H02M 1/12 327/552 |
| 2012/0228938 A1* | 9/2012 | Thieringer | H02M 7/537 307/43 |
| 2014/0043871 A1* | 2/2014 | Shen | H02M 1/12 363/40 |
| 2014/0112025 A1* | 4/2014 | Mueller | H02M 1/10 363/17 |
| 2014/0247000 A1* | 9/2014 | Schoenknecht | H02M 1/08 318/400.27 |
| 2018/0152118 A1* | 5/2018 | Friebe | H02M 1/44 |
| 2018/0351015 A1* | 12/2018 | Hopf | H01L 31/02021 |

* cited by examiner

INVERTER AND CONTROL METHOD FOR AN INVERTER

CROSS REFERENCE TO RELATED APPLICATIONS

This application claims priority to German Patent Application number 10 2016 105 546.8 filed on Mar. 24, 2016, which is hereby incorporated by reference in its entirety.

FIELD

The disclosure relates to an inverter for converting a power provided in the form of a DC voltage as a DC input of the inverter into a power converted into the form of an AC voltage as an AC output of the inverter. In this case, the inverter is suitable for supplying the converted power to an AC mains connected to the AC output. The disclosure likewise relates to a method for operating such an inverter and to a photovoltaic (PV) installation that is designed with such an inverter as a photovoltaic (PV) inverter.

BACKGROUND

DC voltage is converted into AC voltage and direct current is converted into alternating current usually using suitable inverters designed as switched-mode converters. For conversion, conventional inverters comprise a switching network with a plurality of semiconductor switches that are switched on (i.e. switched to low impedance) and switched off (i.e. switched to high impedance) at high frequency by means of appropriate actuation. In this case, for the purpose of signal shaping for the alternating current, the semiconductor switches are usually actuated digitally and using actuating signals that have a clock frequency and a pulse width modulation (PWM) overlaid on this clock frequency. In this case, a desired sinusoidal shape of the alternating current to be supplied to the AC mains is approximated all the better the higher the clock frequency for the conversion of the direct current into alternating current. However, the increase in switching losses means that the efficiency of the inverter usually falls as the clock frequency increases. Although the efficiency of the inverter rises when the clock frequency decreases, the desired sinusoidal shape of the alternating current to be supplied is approximated increasingly poorly and the proportion of harmonics that are overlaid on the alternating current to be supplied increases.

For the supply of alternating current to a public AC mains designed for a power distribution, limit values that specify a permitted proportion of harmonics overlaid on the pure sinusoidal shape for supply are defined on a normative basis. The limit values are usually specified on both a frequency-dependent and a cumulative, i.e. summed over all frequencies, basis and are cited in appropriate country-specific standards using the term THD (THD=Total Harmonic Distortion).

So as now not to exceed the limit values when supplying alternating current to a public power distribution grid (EVN), conventional converters have a passive filter. The passive filter, which usually has inductances and capacitances, provides a high impedance for high frequency interference signals overlaid on the sinusoidal shape and thereby reduces the supply of the interference signals to the AC mains. Passive filters of this kind are expensive, however, and, specifically in the case of inverters in low power classes (usually with a rated power $P_{rated} \leq 5$ kW), contain a not insignificant proportion of the overall costs of the inverter.

A small frequency spacing between the interference signal to be filtered out and the actual useful signal—particularly the frequency of the AC mains of e.g. 50 Hz—requires higher-order passive filters, which have a more complex design and also higher costs. However, higher-order passive filters also still have a certain proportion of undesirable attenuation of the useful signal that increases as the frequency spacing between interference signal and useful signal decreases. In addition, passive filters have only restricted suitability for selective filtering of common-mode and differential-mode signals. In any case, conventional inverters designed as switched-mode converters require complex signal conditioning in order to reject the supply of interference signals overlaid on the alternating current to be supplied.

To reduce harmonics in a power distribution grid, active filters are used. Corresponding active filters are described by way of example in the technical article "*Clean Grid Solutions*" from the Danfoss company under the Internet link http://danfoss.ipapercms.dk/Drives/DD/Global/SalesPromotion/Brochures/ProductBrochures/DE/CleanGrid/. Such filters can be connected to the power distribution grid in parallel with a nonlinear load. These active filters are modified frequency converters with feedback capability that detect harmonic currents present in the power distribution grid and feed back currents phase-shifted through 180° to the power distribution grid. The currents supplied are overlaid with the harmonic currents present in the power distribution grid and thus result in cancellation of the harmonic currents therein. In this case, the power distribution grid is thus initially burdened by an interference current, but this is compensated for again as promptly as possible by the active filter by means of phase-offset supply of current.

DE 10 2014 101 571 A1 discloses an inverter for supplying electric power from a direct current source to an AC mains. In the event of the supply of reactive power during periods of time from a system period of the AC mains that involve the inverter drawing electric power from the AC mains, control of switches of the inverter bridge converts the electric power drawn from the AC mains into heat. This involves the control operating a first switch of the inverter bridge in a linear or a dissipatively clocked mode of operation. This prevents a flow of power from the inverter bridge in the direction of the direct current source.

The documents EP 0578548 A1 and AT 71779 B are disclosing an uninterruptable power supply connected between an AC-mains and a consumer and containing digitally operated as well as linearly operated semiconductor switches.

The document DE 102009 029387 A1 discloses a DC/AC inverter assembly including a semiconductor bridge circuit, wherein a DC/DC converter is provided for creating half-waves of an AC voltage on the output side. The bridge circuit is connected downstream of the DC/DC converter and acts as pole changer on the half-waves

SUMMARY

The disclosure is based on the object of demonstrating an inverter for converting direct current into alternating current that minimizes the previous disadvantages of explicit signal conditioning when converting DC voltage into AC voltage and direct current into alternating current for the supply of power to an AC mains. The disclosure is additionally based on the object of demonstrating an operating method for such an inverter, and a photovoltaic (PV) installation for converting solar power into electric power for supply to an AC mains comprising such an inverter.

An inverter according to the disclosure for supplying a power provided as a DC voltage at a DC input to an AC mains connectable to an AC output comprises a switching network with a plurality of semiconductor switches and a digital control unit for producing a digital switching pattern for digitally operated semiconductor switches of the switching network that are able to be used to produce a first output voltage $U_{out,dig}$. The inverter has a linear control unit for producing signals for actuating at least one semiconductor switch of the switching network in a linear mode. In this case, the linear control unit is set up to produce a voltage drop $U_{out,lin}$ across and/or a current ($I_{out,lin}$) through the at least one linearly operated semiconductor switch to a target value that is dependent on an instantaneous difference between the first output voltage $U_{out,dig}$ and a voltage $U_{AC}$ of the AC mains.

According to the disclosure, the digital control unit actuates the digitally operated semiconductor switches such that the corresponding semiconductor switches are operated as switches in the actual sense, which have, in the switched-on state, a low-impedance connection and, in the switched-off state, a high-impedance connection between load connections of the respective semiconductor switch. In this case, the digital switching pattern can have a pulse width modulation (PWM), which is used to define a period of time for the low-impedance and high-impedance connections between the load connections of the respective semiconductor switch. In its digital mode, a digitally operated semiconductor switch usually has no other than these two digital states. The digitally operated semiconductor switches of the switching network provide a first output voltage $U_{out,dig}$ that generates a flow of current from the inverter to the AC mains connected to the inverter. In this context, the first output voltage $U_{out,dig}$ has typical characteristics of its digital production. Such characteristics are abrupt and/or gradual voltage changes, for example, frequently known as a ripple voltage. In the case of conventional inverters, these characteristics usually result in undesirable interference current components that are overlaid on the current to be supplied.

To reject the undesirable interference current components and the supply thereof, the inverter additionally has the at least one linearly operated semiconductor switch, which is actuated by the linear control unit. To this end, the linear control unit produces signals for actuating the at least one linearly operated semiconductor switch. Depending on the type of semiconductor switch used, these may be current and/or voltage signals. The linearly operated semiconductor switch is capable of smoothly varying an impedance, particularly an ohmic resistance, between its load connections on the basis of its signal for actuation. The current to be supplied to the AC mains may—but does not mandatorily have to—flow via the at least one linearly operated semiconductor switch. In case the current supplied to the AC mains flows via the at least one linearly operated semiconductor switch it produces a voltage drop $U_{out,lin}$ across the latter that counteracts the first output voltage $U_{out,dig}$ driving the current. The voltage drop has a power loss linked to it that is produced on the linearly operated semiconductor switch and is dissipated in the form of heat. Appropriate actuation of the at least one linearly operated semiconductor switch by the linear control unit is now used to vary the voltage drop $U_{out,lin}$ such that a combination—particularly a difference—of the first output voltage $U_{out,dig}$ and the voltage drop $U_{out,lin}$ across the at least one linearly operated semiconductor switch has a sinusoidal shape or a half-cycle-sinusoidal signal shape as a function of time. In the case of a half-cycle-sinusoidal signal shape, every second sinusoidal half cycle can be switched over by a downstream DC/AC converter operating as a polarity reverser, particularly a switchover bridge of the DC/AC converter, and can therefore be converted into a sinusoidal shape. The sinusoidal combination of the first output voltage $U_{out,dig}$ and the voltage drop $U_{out,lin}$ across the at least one linearly operated semiconductor switch is transferred or applied to the AC output of the inverter by the inverter as an output voltage $U_{out}$.

At the same time, the AC output of the inverter is connected to the AC mains. In the state in which the inverter is connected to the AC mains, the output voltage $U_{out}$ is thus equal, at any time, to the AC voltage $U_{AC}$ of the AC mains that is applied to the AC output of the inverter. By changing its output voltage $U_{out}$, the inverter is therefore capable of bringing about, locally at one end of the line arm of the AC mains that is connected to the AC output of the inverter, a change in the AC voltage $U_{AC}$ of the AC mains that is present there locally. As such, by way of example, raising of the output voltage $U_{out}$ by the inverter likewise results in a rectified change in the AC voltage $U_{AC}$ in the AC mains. However, what is meant in this context is that the AC voltage $U_{AC}$ is changed only at the end of the line arm connected to the AC output of the inverter, rather than globally in the entire AC mains. Instead, the local change in the AC voltage $U_{AC}$ at the one end of the line arm produces a voltage gradient in the relevant line arm. The voltage gradient means that there can be a flow of current from the inverter into the relevant line arm of the AC mains, that is to say a supply of a current to the relevant line arm. Hence, when the text below refers to the AC voltage $U_{AC}$ in the AC mains, this means—unless something different is explicitly mentioned—that AC voltage that prevails or can be measured at the end of the line arm of the AC mains that is connected to the AC output of the inverter.

In a state in which no current is supplied to the AC mains connected to the AC output—for example when the internal AC relay of the inverter is open or when the inverter is deactivated—the AC output of the inverter has an AC voltage $U_{AC,zero\ current}$ of the AC mains applied to it that characterizes the zero-current state (of the inverter). For the supply of an active power to the AC mains, the output voltage $U_{out}$ provided at the AC output of the inverter in the activated state of the inverter, that is to say the difference in the first output voltage $U_{out,dig}$ and the voltage drop $U_{out,lin}$, is advantageously in phase with the AC voltage $U_{AC,zero\ current}$ characterizing the zero-current state in the AC mains and, in terms of amplitude, slightly above an amplitude of the AC voltage $U_{AC,zero\ current}$ characterizing the zero-current state in the AC mains. A raise in the AC voltage $U_{AC}$ of the AC mains by the output voltage $U_{out}$ provided by the inverter at the AC output of the inverter results in a voltage gradient in the relevant line arm of the AC mains and hence in a supply of power to the AC mains via the AC output. By virtue of the actuation of the linearly operated switches being effected such that the voltage drop $U_{out,lin}$ in combination with the first output voltage $U_{out,dig}$ has an extreme sinusoidal shape, this results in a likewise extremely sinusoidal current $I_{out}$ flowing to the AC mains when there is a sinusoidal AC voltage $U_{AC,zero\ current}$ in the AC mains that prevails even in a zero-current state. In the event of the extremely sinusoidal current $I_{out}$ being supplied to the AC mains in the form of an active power, it is possible to compute the target value for the voltage drop $U_{out,lin}$. Put in mathematical terms, the result in this case is that the target value for the voltage drop $U_{out,lin}$ is equal to an instantaneous difference between the first output voltage $U_{out,dig}$ and the AC voltage $U_{AC}$ of the AC mains, i.e. it holds that $U_{out,lin}=U_{out,dig}-U_{AC}$. In this case, the AC voltage $U_{AC}$ of the AC mains is slightly above the AC voltage $U_{AC,zero\ current}$ in the AC mains that prevails in a zero-current state ($I_{out}=0$), i.e. it holds that $U_{AC}=k*U_{AC,zero\ current}$, where k≥1.

The at least one linearly operated semiconductor switch may be a semiconductor switch that is operated exclusively linearly. Equally, however, it is possible for the relevant linearly operated semiconductor switch to be operated linearly only during one particular period of time and digitally during another period of time. The same thus likewise applies to a digitally operated semiconductor switch. Alternatively, it is possible to use, instead of one semiconductor switch, a series circuit comprising a first and a second semiconductor switch. In this case, the first semiconductor switch in the series circuit can be operated exclusively digitally and the second semiconductor switch in the series circuit can be operated exclusively linearly.

The switching network has a capacitance upstream on the input side. This capacitance, which can comprise an input capacitance of the inverter, for example, is capable of buffering an electric power provided as a DC voltage or direct current by the DC source and of providing the electric power in the form of a DC voltage source for the switching network. In this case, the magnitude of the capacitance is chosen such that the inverter operates as a voltage-fed—rather than as a current-fed—inverter.

Production of the voltage drop $U_{out,lin}$ across the at least one linearly operated semiconductor switch using the linear control unit can comprise regulation or setting of the voltage drop $U_{out,lin}$. In both variants—i.e. regulation or setting—electrical parameters can be measured during production of the voltage drop $U_{out,lin}$ and can be used as control or regulator parameters for regulation or setting. By way of example, a voltage drop across the at least one linearly operated semiconductor switch can be measured directly. In the same way, it is alternatively or cumulatively possible for a current flowing via the at least one linearly operated semiconductor switch to be measured and/or to be used as a control or regulatory parameter. In addition, the voltage drop $U_{out,lin}$ across the linearly operated semiconductor switch can be produced in direct or indirect manner. In the event of indirect production of the voltage drop $U_{out,lin}$, the regulation or setting can be aimed primarily at a parameter that is different from the voltage drop $U_{out,lin}$, and the voltage drop $U_{out,lin}$ may be a secondary parameter obtained on the basis of the primarily varied parameter. In this case, the primary parameter may be e.g. an ohmic resistance between the load connections, or a current flowing via the load connections of the semiconductor switch. The same is accordingly also valid for the production of the current $I_{out,lin}$ through the at least one semiconductor switch using the linear control unit.

Since the voltage drop $U_{out,lin}$ across as well as the current $I_{out,lin}$ through the at least one semiconductor switch can be produced smoothly, in principle, on the basis of the actuating signal, it is possible to attain a very good approximation of the desired sinusoidal shape in combination with the first output voltage $U_{out,dig}$. Accordingly, the current $I_{out}$ to be supplied to the AC mains connected to the AC output has a significantly reduced, possibly even negligible proportion of harmonics. Additional signal conditioning for the current to be supplied using a passive filter can therefore ideally be dispensed with entirely, but has at least its complexity significantly reduced. An interference signal overlaid on the current ($I_{out}$) to be supplied, the frequency of which interference signal is close to the useful frequency of the AC voltage in the AC mains, can also be reduced without significant attenuation of the useful signal. The voltage drop $U_{out,lin}$ can be set or regulated at a frequency that corresponds to a multiple of the frequency of the AC voltage of the AC mains. In some cases, it may be significantly lower than the clock frequency of the conventional inverter, which is designed as a purely digitally operating switched-mode converter. Therefore, the linear control unit generally has low complexity. The disadvantage of a power loss, which arises to an increased extent in this case, at the at least one linearly operated semiconductor switch and the effect thereof on the efficiency of the inverter is accepted in this case, since the advantages attained specifically in the case of inverters with a low rate of power outweigh this disadvantage. Additionally, the power loss can be minimized further by means of suitable signal preshaping—e.g. by further digitally operated switches at the switching network.

In one embodiment, the switching network comprises a DC/AC converter having at least one half-bridge—optionally having two half-bridges. The input of the DC/AC converter is connected to the DC input of the inverter via the input capacitance, while an output of the DC/AC converter is connected to the AC output of the inverter. In this case, the DC/AC converter may be connected to the DC input and/or the AC output either directly or indirectly—i.e. with interposition of further components. By way of example, the output of the DC/AC converter may be connected to the AC output of the inverter via a passive filter.

In one advantageous embodiment, the at least one half-bridge comprises a multilevel half-bridge. Optionally, each half-bridge of the DC/AC converter is embodied in the form of a multilevel half-bridge. A multilevel half-bridge in conjunction with a capacitance divided into multiple levels allows the switching network to perform signal preshaping and hence to reduce the power loss arising over the at least one linearly operated semiconductor switch.

In a further embodiment, the switching network comprises a DC/DC converter that is connected to the DC/AC converter via a link circuit. In this case, the DC/DC converter can comprise a step-up converter, a step-down converter or a combined step-up/step-down converter. In addition, the DC/DC converter may be set up to produce a pulsed DC voltage, particularly a half-cycle-sinusoidal DC voltage. The DC/AC converter may be in the form of a polarity reverser. In the configuration of this kind too, the inverter is capable of performing signal preshaping for the DC voltage of the DC source, which is already a very close approximation to the desired sinusoidal shape. In this case, the voltage drop $U_{out,lin}$ across the at least one linearly operated semiconductor switch is used merely to reduce or remove a voltage ripple that is still present, which is overlaid on the pulsed, in particular half-cycle-sinusoidal, DC voltage present across the link circuit. Every second pulse of the pulsed, in particular half-cycle-sinusoidal, DC voltage is switched over by the DC/AC converter designed as a polarity reverser and, as such, converted into an AC voltage.

The at least one linearly operated semiconductor switch may be a component of the DC/DC converter or of the DC/AC converter within the switching network. Equally, it is possible for the switching network to have multiple linearly operated semiconductor switches, of which the DC/DC converter comprises a first number and the DC/AC converter comprises a second number. In one embodiment, the at least one linearly operated semiconductor switch is part of a connection between the at least one half-bridge or between the two half-bridges and the link circuit. In a further embodiment, the at least one linearly operated semiconductor switch is part of a connection between the at least one half-bridge or between the two half-bridges and the input capacitance. In an alternative embodiment, the at least one linearly operated semiconductor switch is part of a connection between a centre tap of the half-bridges and the AC output. In addition, with respect to the arrangement of the at least one linearly operated semiconductor switch, a combination of the latter two embodiments is possible.

In a further embodiment, the at least one linearly operated semiconductor switch comprises a first and a second semiconductor switch in linear mode. In this case, the first and second semiconductor switches are operated at the same time (concurrently). In this case the voltage drop $U_{out,lin}$ can be formed by the first and second semiconductor switches in linear mode collectively. For this purpose, the first and second linearly operated semiconductor switches are arranged within a current path through which the current $I_{out}$ to be supplied flows. Within the current path, they are interconnected relative to one another in a series circuit. In addition to the second linearly operated semiconductor switch, there may also be further linearly operated semiconductor switches, which allow the resultant power loss to be distributed over multiple semiconductor switches. The further linearly operated semiconductor switches are then also interconnected in series with one another and in series with the first or second linearly operated semiconductor switch within the current path.

In an alternative embodiment of the inverter the at least one semiconductor switch operated in linear mode is arranged not within, but aside a current path, through which current path the current to be supplied to the AC-mains is flowing. Here a current fraction of the current to be supplied is guided through the at least one linearly operated semiconductor switch, bypassed away from the AC-output of the inverter and therefore particularly not supplied to the AC-mains.

The at least one semiconductor switch operated in a linear mode can comprise a bipolar transistor, an IGBT (IGBT=Insulated Gate Bipolar Transistor) or a MOSFET (MOSFET=Metal Oxide Semiconductor Field Effect Transistor). Both are operated in linear mode in their respective linear range. In this case, the linear range of a bipolar transistor is characterized in that the bipolar transistor operates in a current-amplifying mode, in which a base current $I_B$ uses a gain factor ß to amplify a current $I_C$ between the relevant load connections of the bipolar transistor. Therefore, in linear mode, a current gain according to $I_C=\beta*I_B$ is obtained for the bipolar transistor to the greatest extent independently of the voltage between the load connections. The bipolar transistor is actuated by means of the linear control unit such that its base has a base current $I_B$ applied to it. Depending on the level of the base current $I_B$, a load current $I_C$ appears between the load connections of the bipolar transistor. Although said load current is driven by the voltage difference between the load connections, it is for the greater extent independent of this voltage difference in the linear range. In this respect, production of the voltage drop $U_{out,lin}$ across the bipolar transistor as a linearly operated semiconductor switch can be understood more readily as setting, particularly as indirect setting.

A MOSFET operated in a linear range is actuated by means of a voltage on the gate connection. The higher the gate voltage, the lower the ohmic resistance between the load connections of the MOSFET. In this case, the load current is dependent on the voltage difference between the load connections and production of the voltage drop $U_{out,lin}$ across the MOSFET as a linearly operated semiconductor switch can more readily be implemented in the form of a regulatory process. A transmission response of an IGBT is also controlled by means of a voltage on its gate, which is why an IGBT behaves similarly to a MOSFET in this regard. Therefore, the statements made in relation to the MOSFET can also be transferred to the IGBT as a semiconductor switch. Regardless of whether production of the voltage drop is regulation and/or setting, a load current and/or a voltage drop between the load connections of the semiconductor switch can be detected by means of a current sensor or by means of a voltage sensor and used for regulating or setting the voltage drop $U_{out,lin}$.

In one advantageous embodiment of the disclosure, the inverter comprises no passive filter between the DC/AC converter and the AC output. In this case, the current $I_{out}$ to be supplied to the AC mains connected to the AC output has any existing interference signals that are overlaid on the current $I_{out}$ removed adequately by means of the voltage drop $U_{out,lin}$ of the at least one linearly operated semiconductor switch. In this case, no further filtering by means of a passive filter is required before the current $I_{out}$ is supplied to the AC mains. However, depending on normatively prescribed limit values, the inverter can alternatively also have a passive filter between the DC/AC converter and the AC output. However, in this case, the relevant passive filter may be a much simpler and less expensive design.

A control method according to the disclosure for an inverter for supplying a power provided as a DC voltage at a DC input to an AC mains connectable to the AC output, wherein the inverter comprises a switching network with a plurality of semiconductor switches and a digital control unit for digitally operated semiconductor switches of the switching network is provided. The method comprises
actuation of the digitally operated semiconductor switches of the switching network using a digital switching pattern produced in the digital control unit, and
determination of a difference between a first output voltage $U_{out,\ dig}$ of the switching network, produced by the digital switching pattern, and an AC voltage $U_{AC}$ of the AC mains. The method further comprises
production of a voltage drop $U_{out,\ lin}$ across and/or a current $I_{out,lin}$ flowing through the at least one semiconductor switch, operated in a linear mode, of the switching network, by actuation of the at least one semiconductor switch operated in a linear mode using a linear control unit, to a target value determined on the basis of the difference.

By means of the production of the voltage drop $U_{out,lin}$ across the at least one linearly operated semiconductor switch, a power loss is produced in the semiconductor switch that strips power from a current flowing via the semiconductor switch. The power loss is dissipated in the form of heat. The voltage drop $U_{out,lin}$ can be produced by means of a regulation and/or a setting process—in a direct or indirect manner in each case. By virtue of the voltage drop $U_{out,lin}$ across and/or the current through the at least one semiconductor switch being regulated or set to a target value that is dependent on the instantaneous difference between the first output voltage $U_{out,dig}$ and the AC voltage $U_{AC}$ of the AC mains, it is possible for voltage spikes or voltage ripple, which would lead to an interference current being overlaid on the current to be supplied, to be removed by dissipation in a specific manner before the current is supplied to the AC mains. It is therefore possible to supply a highly sinusoidal current $I_{out}$ to the AC mains via the inverter. When the highly sinusoidal current is supplied to the AC mains, the total voltage drop across all linearly operated semiconductor switches can be computed. In mathematical terms, this results in the target value for the voltage drop $U_{out,lin}$, when electric active power is supplied to the AC mains, being equal to an instantaneous difference between the first output voltage $U_{out,dig}$ and the AC voltage $U_{AC}$ of the AC mains, i.e. it holds that $U_{out,lin}=U_{out,dig}-U_{AC}$. As regards the importance of the AC voltage, the statements already made in connection with the description of the inverter also apply here mutatis mutandis. The AC voltage $U_{AC}$ in the AC mains is slightly raised in the supplying mode ($I_{out}\neq 0$) of the inverter in comparison with an AC voltage $U_{AC,zero\ current}$ of the AC mains that characterizes the zero-current state ($I_{out}=0$), i.e. it holds that: $U_{AC}=k*U_{AC,zero\ current}$ where $k\geq 1$.

In practice, the control method is used to remove, but at least partially remove, any existing interference current from the current to be supplied, before it is supplied, by dissipation using a power loss arising at the semiconductor switch. In this way, a combination of the first output voltage $U_{out,dig}$ and the voltage drop $U_{out,lin}$ across the at least one linearly operated semiconductor switch can deliver a voltage, driving relative to the AC voltage $U_{AC}$ of the AC mains, that comes very close to a desired sinusoidal shape, ideally even corresponds thereto. Since the voltage driving the current to be supplied is highly sinusoidal, this also holds for the current $I_{out}$ to be supplied. The current $I_{out}$ to be supplied or cleaned up before it is supplied can be kept almost free of undesirable interference current components. The advantages already stated in connection with the inverter are obtained.

In an advantageous variant of the control method the at least one semiconductor switch operated in linear mode is arranged within a current path, through which current path the current to be supplied to the AC-mains is flowing. In this case the current to be supplied is more or less attenuated by changing the ohmic resistance of the at least one linearly operated semiconductor switch and by the voltage drop across the semiconductor switch so produced, Typically the ohmic resistance between the load connections of the at least one semiconductor switch tends to be low in this case and typically is in the range between 1 times and 100 times the ohmic resistance of fully closed semiconductor switch. However, also short periods with higher values in the ohmic resistance of the at least one linearly operated semiconductor switch are possible.

In an alternative embodiment of the control method the at least one semiconductor switch operated in linear mode is arranged not within, but aside the current path, through which the current $I_{out}$ to be supplied to the AC-mains is flowing. In this case a fraction of the current $I_{out}$ to be supplied is guided through the at least one linearly operated semiconductor switch, whereby the current fraction is bypassed away from the AC-output of the inverter and not supplied to the AC-mains. Only a remaining rest of the current $I_{out}$ to be supplied flows through the AC-output of the inverter and therefore is supplied to the AC-mains. In other words the at least one semiconductor switch operated in linear mode opens a current bypass path away from the AC-output in order to suppress a current fraction that is guided through the linearly operated semiconductor switch to be supplied to the AC-mains. Typically the ohmic resistance of the at least one linearly operated semiconductor switch is relatively high. However, also short periods comprising a fairly low resistance value between load connections of the linearly operated semiconductor switch are possible.

In one advantageous variant of the control method, the at least one linearly operated semiconductor switch comprises a first and a second linearly operated semiconductor switch operated concurrently. In one embodiment the current ($I_{out}$) to be supplied also flows through the first and the second linearly operated semiconductor switch. In this case the voltage drop $U_{out,lin}$ is formed by the first linearly operated semiconductor switch and the second linearly operated semiconductor switch collectively. In one embodiment, ohmic resistances of the first and second linearly operated semiconductor switches are varied at the same time (concurrently) and concordantly as one another or rather synchronously to one another. The synchronous change in the ohmic resistances of the first and second linearly operated semiconductor switches then allows selective manipulation, in particular a selective reduction of a differential-mode interference signal that is overlaid on the current $I_{out}$ to be supplied to the AC mains. In an alternative embodiment, it is likewise possible to selectively manipulate, in particular selectively reduce a common-mode interference signal overlaid on the current $I_{out}$ to be supplied. To this end, the ohmic resistances of the first and second linearly operated semiconductor switches are varied inversely with respect to one another over time. Inversely over time in this case means particularly that a change in the ohmic resistance of the first linearly operated semiconductor switch is accompanied by a change at the magnitude—but negative—in an ohmic resistance of the second semiconductor switch. In this case, the voltage drop $U_{out,lin}$ that is obtained from the sum of the voltage drops across the individual linearly operated semiconductor switches remains constant to the greater extent. In this way, it is possible to selectively filter out the common-mode interference signal from the current $I_{out}$ to be supplied to the AC mains.

In an alternative embodiment of the control method the first and the second linearly operated semiconductor switch are arranged aside of a current path, through which current path the current ($I_{out}$) to be supplied to the AC-mains is flowing. Also in this case it is possible, to selectively manipulate, or even selectively reduce a differential-mode as well as a common-mode interference signal overlaid on the current $I_{out}$ to be supplied. As will be explained in combination with FIGS. 5a and 5b, via a concurrent and concordant, or even synchronous variation of the ohmic resistances of the first and the second linearly operated semiconductor switches a differential-mode interference signal overlaid on the current Iout to be supplied can be selectively manipulated or reduced. Additionally, via a concurrent but inverse variation of the ohmic resistances of the first and the second linearly operated semiconductor switch relative to one another a common mode interference signal overlaid on the current Iout to be supplied can selectively be manipulated, or selectively be reduced.

Independent on whether the first and second linearly operated semiconductor switches are arranged within or aside the current path, in which the current to be supplied to the AC-mains is flowing, it is additionally possible for the overall power loss arising to be split over multiple semiconductor switches, and thermal overloading of an individual semiconductor switch is significantly reduced. It is also possible for the power loss of the first linearly operated semiconductor switch and that of the second linearly operated semiconductor switch each to be distributed over a plurality of linearly operated semiconductor switches. In a further variant of the control method it is also possible to combine the selective manipulation of the differential mode interference signal with the selective manipulation of the common mode interference signal. By virtue of this it is possible to manipulate, or even reduce an interference signal overlaid on the current $I_{out}$ to be supplied that comprises differential-mode as well as common-mode portions.

In a further embodiment of the control method, the inverter has a DC/DC converter, the output side of which is connected via a link circuit to an input of the DC/AC converter. The input side of the DC/DC converter is connected to the DC input or the input capacitance of the inverter. The DC/DC converter is used to produce a pulsed DC voltage, particularly a half-cycle-sinusoidal DC voltage across the link circuit. A current amplitude of the current $I_{out}$ to be supplied to the AC mains is now controlled by means of a voltage amplitude $U_{0,LNK}$ of the pulsed DC voltage produced across the link circuit by the DC/DC converter, particularly the half-cycle-sinusoidal DC voltage. The higher the voltage amplitude $U_{0,LNK}$ of the pulsed DC voltage is chosen for an otherwise approximately identical voltage drop $U_{out,lin}$ of the at least one linearly operated semiconductor switch, the larger too the current $I_{out}$, or the amplitude thereof, to be supplied to the AC mains or supplied thereto. In an alternative embodiment, it is also possible for the voltage amplitude $U_{0,LNK}$ of the pulsed DC voltage on the link circuit to be chosen to be sufficiently high, but constant, and for variation of the current $I_{out}$ to be supplied, or the amplitude thereof, to be performed by means of an appropriate change of the ohmic resistance and hence for the voltage drop $U_{out,lin}$ of the at least one linearly operated semiconductor switch. Whereas, in the first case, the voltage drop $U_{out,lin}$ removes only a voltage ripple that is still present on the pulsed DC voltage, in the latter case, a supplementary component of the voltage drop $U_{out,lin}$ is additionally used to limit an amplitude of the current $I_{out}$ to be supplied. Accordingly, the power loss arising in the latter case is higher than in the former case.

For one purpose of the inverter, the inverter is designed as a photovoltaic (PV) inverter. A photovoltaic (PV) installation according to the disclosure has, in this case, the inverter designed as a PV inverter and a photovoltaic (PV) generator connected to the DC input of the inverter. In this case, the photovoltaic (PV) installation can be connected to a public power supply system via the AC output of the inverter in order to supply electric power.

Advantageous developments of the disclosure will emerge from the patent claims, the description and the drawings. The advantages, cited in the description, of features and of combinations of multiple features are merely exemplary and can take effect alternatively or cumulatively without the advantages necessarily having to be attained from embodiments according to the disclosure. Without this altering the subject matter of the attached patent claims, the following applies in respect of the disclosure content of the original application documents and the patent: further features are evident from the drawings—particularly the depicted relative arrangement and operative connection of multiple assemblies. The combination of features of different embodiments of the disclosure or of features of different patent claims is likewise possible as a departure from the selected back-references of the patent claims, and is encouraged hereby. This also relates to such features as are depicted in separate drawings or are cited in the description thereof. These features can also be combined with features of different patent claims. Similarly, features listed in the patent claims can be dispensed with for further embodiments of the disclosure.

The features mentioned in the patent claims and the description should be understood, with regard to their number, such that exactly this number or a greater number than the number mentioned is present, without the need for explicit use of the adverb "at least". Therefore, if an element is mentioned, for example, this should be understood to mean that exactly one element, two elements or more elements are present. These features can be supplemented by other features or the sole features of which the respective product consists.

The reference symbols contained in the patent claims do not restrict the scope of the subjects protected by the patent claims. They merely serve the purpose of making the patent claims more easily understood.

BRIEF DESCRIPTION OF THE FIGURES

The disclosure is explained and described to a further degree below on the basis of preferred exemplary embodiments that are depicted in the figures.

DETAILED DESCRIPTION

Figure 1A:
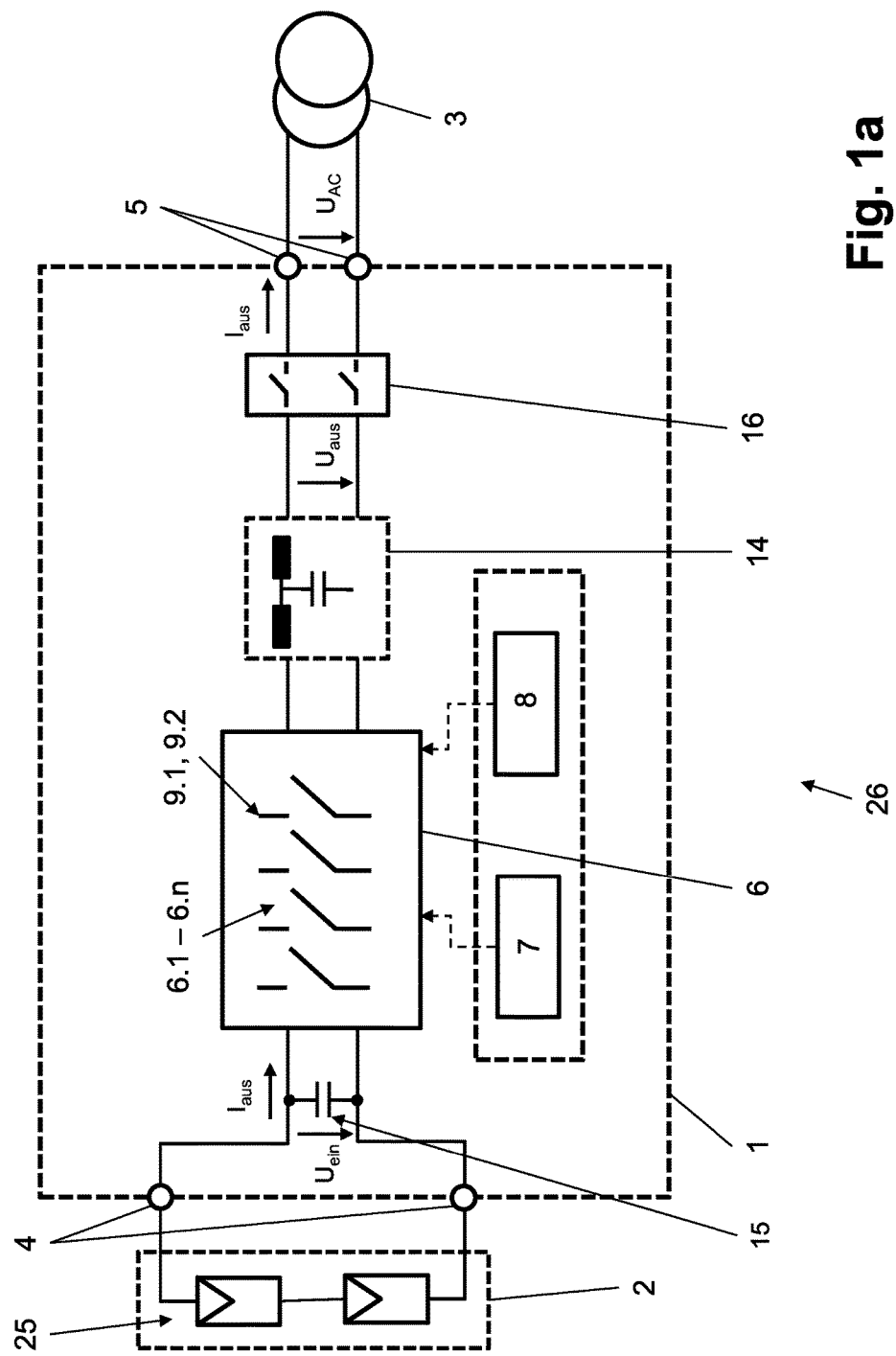
FIG. 1a shows a schematic depiction of a photovoltaic (PV) installation according to the disclosure with an inverter according to the disclosure as a photovoltaic (PV) inverter.

FIG. 1a illustrates a schematic depiction of a photovoltaic (PV) installation (26) according to the disclosure with an inverter (1) according to the disclosure as a photovoltaic (PV) inverter. The inverter has a DC input (4) to which a DC source (2), in this case a photovoltaic (PV) generator (25), is connected. The inverter (1) has an AC output (5) connected to an AC mains (3), to which an electric power drawn from the DC source (2) is supplied by the inverter (1) following a conversion of direct current to alternating current or from DC voltage to AC voltage. To convert the power provided as DC voltage, the inverter (1) has a switching network (6) that contains multiple semiconductor switches (6.1-6.n, 9.1, 9.2). The switching network (6) has an input capacitance (15) upstream of it that provides a buffer for the DC voltage or the direct current at the DC input (4) and results in the inverter behaving like a voltage-fed inverter. Digitally operated semiconductor switches (6.1-6.*n*) of the switching network (6) are actuated by means of a digital control unit (7) and switched either to a conductive (low-impedance) or a nonconductive (high-impedance) state by means of the latter. In this case, an actuating signal or a switching pattern of the digital control unit (7) can have a pulse width modulation (PWM). Appropriate actuation of the digitally operated semiconductor switches (6.1-6.*n*) converts an input voltage ($U_{in}$) provided at the input capacitance (15) into a first output voltage ($U_{out,dig}$) at the output of the digitally operated switches (6.1-6.*n*). In addition, the switching network (6) has at least one linearly operated semiconductor switch (9.1, 9.2) that is actuated by means of a linear control unit (8). In the event of linear actuation of the at least one linearly operated semiconductor switch (9.1, 9.2), the ohmic resistance is changed between load connections of the semiconductor switch (9.1, 9.2) smoothly in general, so that a voltage drop ($U_{out,lin}$) is generated across the semiconductor switch (9.1, 9.2) by a current flowing via its load connections. The voltage drop ($U_{out,lin}$) across the linearly operated switch(es) (9.1, 9.2) is (are) then adjusted—particularly set and/or regulated—by means of the linear control unit (8) such that, in combination with the first output voltage ($U_{out,dig}$), a driving voltage for the current ($I_{out}$) to be supplied results that, on account of a basically smooth variation capability for the voltage drop ($U_{out,lin}$), has no further abrupt changes. Instead, the combined voltage has a significantly smooth profile and comes very close to a desired sinusoidal shape. The combination of the first output voltage ($U_{out,dig}$) and the voltage drop ($U_{out,lin}$), particularly the difference therein, corresponds to the output voltage $U_{out}$ of the inverter (1), i.e. it holds that $U_{out}=U_{out,dig}-U_{out,lin}$. The output voltage is connected to the AC output (5) via an AC relay (16) of the inverter (1). When the AC relay (16) is closed, the output voltage $U_{out}$ of the inverter is hard-coupled to an AC voltage $U_{AC}$ for the AC mains (3), particularly to an AC voltage $U_{AC}$ that is applied to a line arm end of the AC mains (3) that is connected to the AC output (5) of the inverter (1). When there is hard coupling or a closed AC relay (16), therefore, the two voltages are equal at any time, i.e. it holds that $U_{out}=U_{AC}$. Hence, the inverter (1) is capable of altering the voltage at the line arm end of the AC mains (3) at least slightly, and thus producing a voltage gradient within the line arm that allows a current $I_{out}$ to be supplied in the direction of the AC mains (3). Taking into consideration the sinusoidal output voltage ($U_{out}$) or the sinusoidal AC voltage ($U_{AC}$) of the AC mains (3), the current ($I_{out}$) to be supplied generated by means of the driving voltage is also smooth and free of abrupt changes. Instead, the current ($I_{out}$) has, likewise to a great extent, a desired sinusoidal profile that is to the greatest extent free of harmonics. To supply the current ($I_{out}$), the combination of the first output voltage ($U_{out,dig}$) and the voltage drop ($U_{out,lin}$) is provided at the AC output (5) of the inverter (1).

The digital control unit (7) and the linear control unit (8) may be separate control units within the inverter, but they may also be part of a superordinate control system of the inverter (1), which is symbolized in FIG. 1*a* by means of a dashed border for the two control units (7, 8). The inverter (1) can optionally have a passive filter (14) for filtering interference current components that are still present out of the current ($I_{out}$) to be supplied. In this case, the passive filter (14) has an interconnection of inductances and capacitances. The passive filter (14) is an optional component that may be present, but does not have to be present. Therefore, it is depicted in dashed form in FIG. 1*a*. If present, the passive filter (14) may be of significantly simpler and cheaper design in comparison with conventional passive filters, however, since the current ($I_{out}$) to be supplied now contains only small components of interference current on account of signal shaping of dissipative design that has already taken place.

Figure 1B:
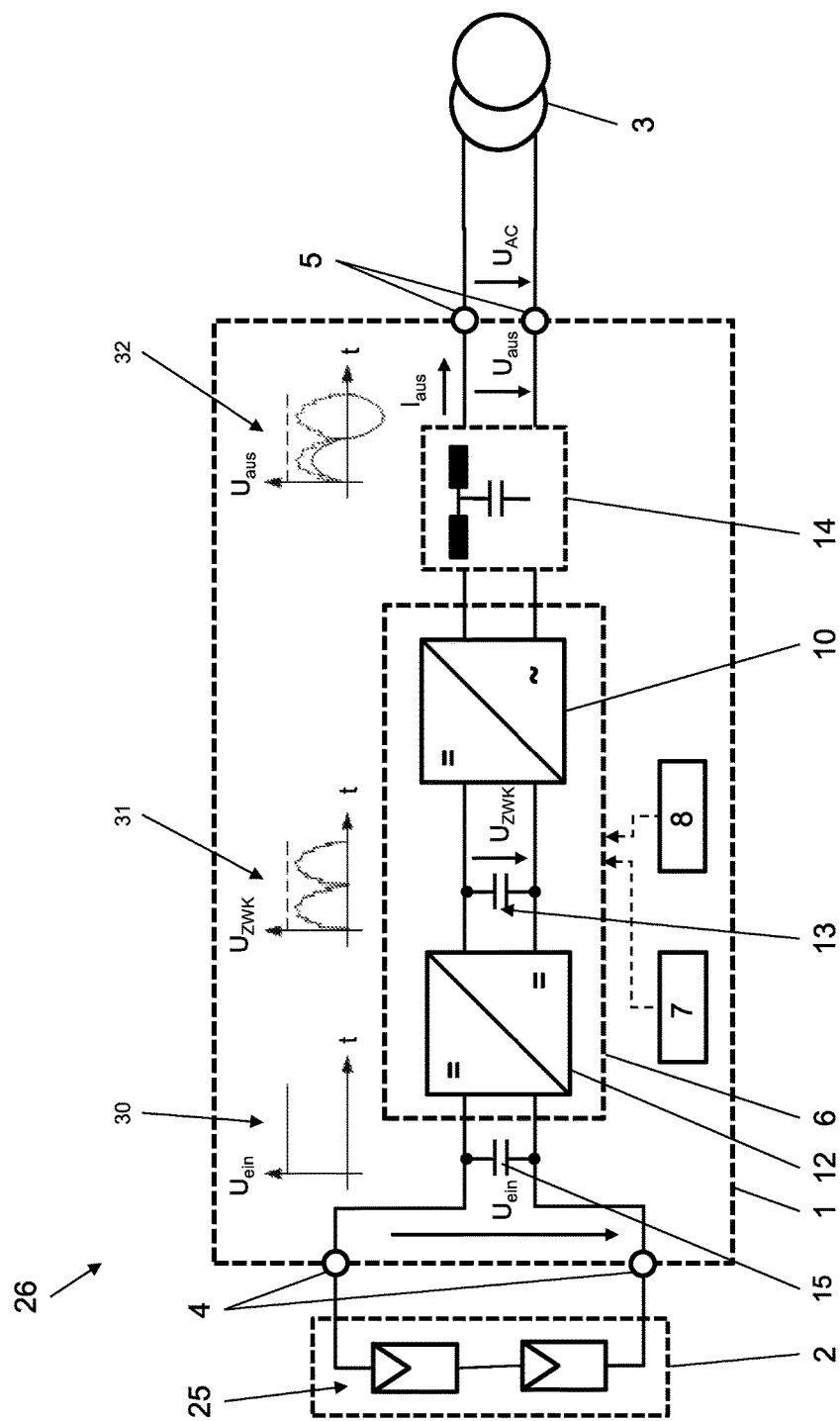
FIG. 1b shows a PV installation with a first embodiment of the inverter according to the disclosure as a PV inverter in a more detailed depiction.

FIG. 1*b* shows a PV installation (26) with a first embodiment of the inverter (1) according to the disclosure as a PV inverter in a more detailed depiction in comparison with FIG. 1*a*. Similar components of the inverter (1) that also appear in FIG. 1*a* are provided with like reference symbols in FIG. 1*b*—as in the subsequent figures. To describe these components, reference is made to the corresponding explanations and the description of figures relating to FIG. 1*a*.

Relative to FIG. 1*a*, FIG. 1*b* depicts the switching network (6) of the inverter (1) in more detail. In this embodiment, the switching network (6) has a DC/DC converter (12) whose input is connected to the DC input (4) of the inverter (1) via the input capacitance (15). An output of the DC/DC converter (12) is connected to an input of a DC/AC converter (10) via a link circuit (13). The output of the DC/AC converter (10) is connected to the AC output (5) of the inverter via an optional passive filter (14).

The DC/DC converter (12) is designed as a combined step-up/step-down converter and, for this purpose, has some of the digitally operated semiconductor switches (6.1-6.*j*, where j<n). It is essentially actuated by means of the digital control unit (7) with the aim of converting the input voltage ($U_{in}$) provided at the DC input (4) or of the input capacitance (15) by the DC source (2), as a DC voltage, into a pulsed, particularly into a half-cycle-sinusoidal pulsed voltage ($U_{LNK}$) across the link circuit (13). On account of the digitally operated semiconductor switches (6.1-6.*j*) of the DC/DC converter (12), the pulsed DC voltage ($U_{LNK}$) dropped across the link circuit (13) has a ripple-like profile. Individual half-cycles of the pulsed DC voltage ($U_{LNK}$) present across the link circuit (13) have subsequently been switched over by means of the DC/AC converter (10) operating as a polarity reverser and, as such, converted into an AC voltage. The voltage ripple still present is removed by dissipation, but at least reduced, by means of at least one linearly operated semiconductor switch (9.1, 9.2) of the DC/AC converter (10). For this purpose, the DC/AC converter (10) is connected for control purposes both to the digital control unit (7) and to the linear control unit (8), since it firstly contains individual instances of the digitally operated semiconductor switches (6.*j*+1-6.*n*) as well as the at least one linearly operated semiconductor switch (9.1, 9.2). The digitally and linearly operated switches are not depicted explicitly in FIG. 1*b* for reasons of clarity. The connection for control purposes is symbolized in FIG. 1*b*—and in FIG. 1*a*—by means of dashed arrows to the switching network (6).

At particular points in the inverter (1), voltage profiles observable therein are outlined schematically as a function of time. As such, above the input capacitance (15) the time profile of the input voltage ($U_{in}$) is outlined, which corresponds to that of a pure DC voltage. This does not mean that the input voltage ($U_{in}$) does not actually change over time. As such, it changes on the basis of a Maximum Power Point (MPP) tracking method alone—at least on a macroscopic timescale, e.g. on a timescale of a few seconds, or minutes. By contrast, a change in the input voltage ($U_{in}$) does not take place, but at least to a much smaller extent, on a microscopic timescale, e.g. on a timescale of a few oscillation periods of the frequency in the AC mains (3). Above the link circuit (13), the time profile of the voltage dropped across that ($U_{LNK}$) is depicted. This time profile corresponds to a half-cycle-sinusoidally pulsed DC voltage that has a voltage ripple overlaid on it. At the AC output (5), the time profile of the output voltage ($U_{out}$) applied thereto is outlined schematically. This time profile corresponds to an AC voltage that has a smooth sinusoidal shape. The voltage ripple is removed, but at least significantly reduced, by the at least one linearly operated semiconductor switch (9.1, 9.2). In the time profile of the output voltage ($U_{out}$), the half-cycle-sinusoidally pulsed DC voltage, including the voltage ripple that is still present, as the DC voltage dropped across the link circuit (13) previously, is also outlined in dashes again for the sake of clarity. To detect voltages, voltage drops and/or currents, there may be suitable voltage and/or current sensors present. These may be connected to a separate evaluation and a regulatory device that may in turn be operatively connected to the digital control unit (7) or the linear control unit (8) and performs or supports regulation or setting of the voltage drop in conjunction with the control. Alternatively, the evaluation and regulatory device may also be an integral part of the digital control unit (7) or linear control unit (8) or of a superordinate control system of the inverter (1). For reasons of clarity, the sensors and the evaluation and regulatory device are not depicted in FIG. 1b—or in the subsequent figures. Similarly, the AC relay (16) is not depicted explicitly in FIG. 1b, or in the subsequent figures, for reasons of clarity. It may nevertheless be present, however.

Figure 2A:
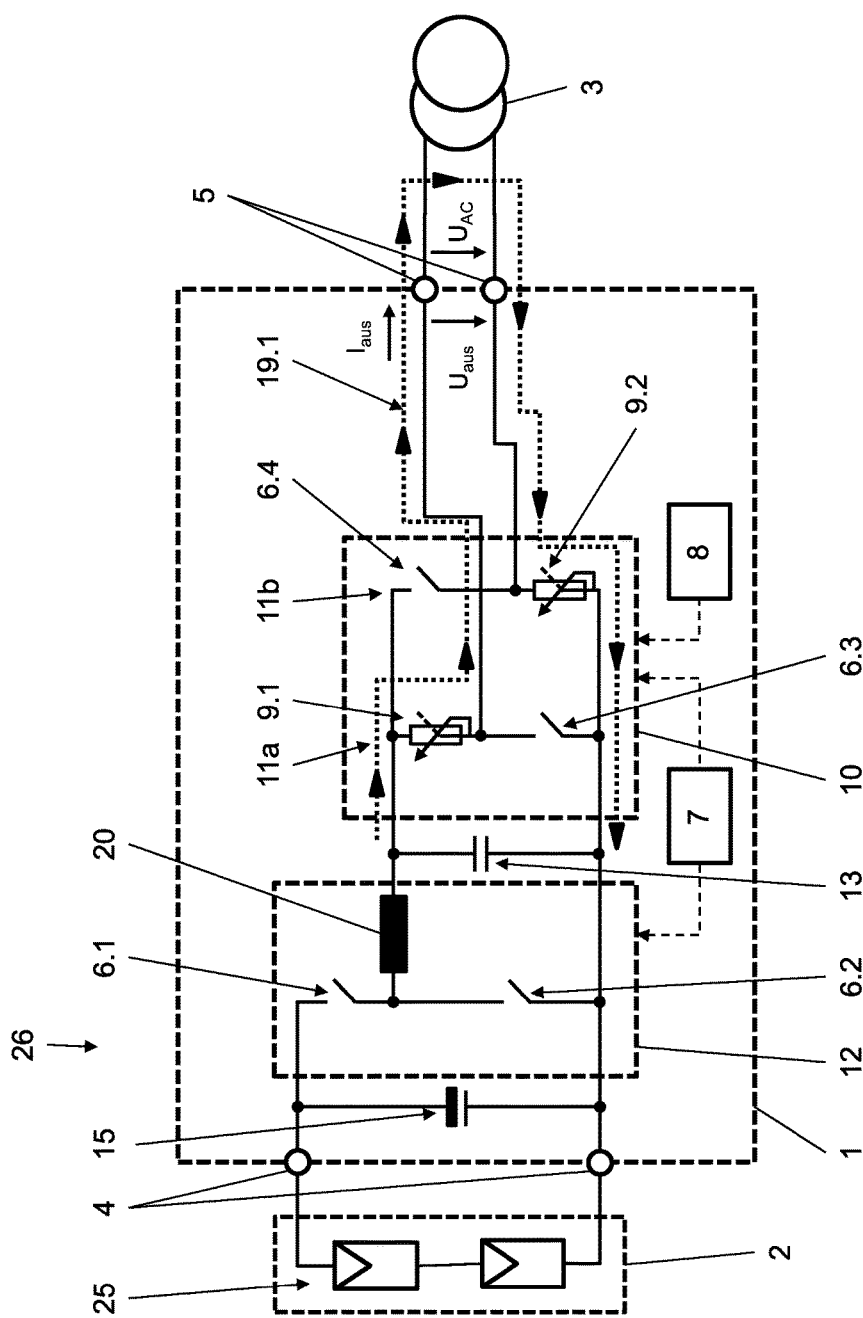
FIG. 2a illustrates a PV installation with a current profile for the current to be supplied at a time in a second embodiment of the inverter.
Figure 2B:
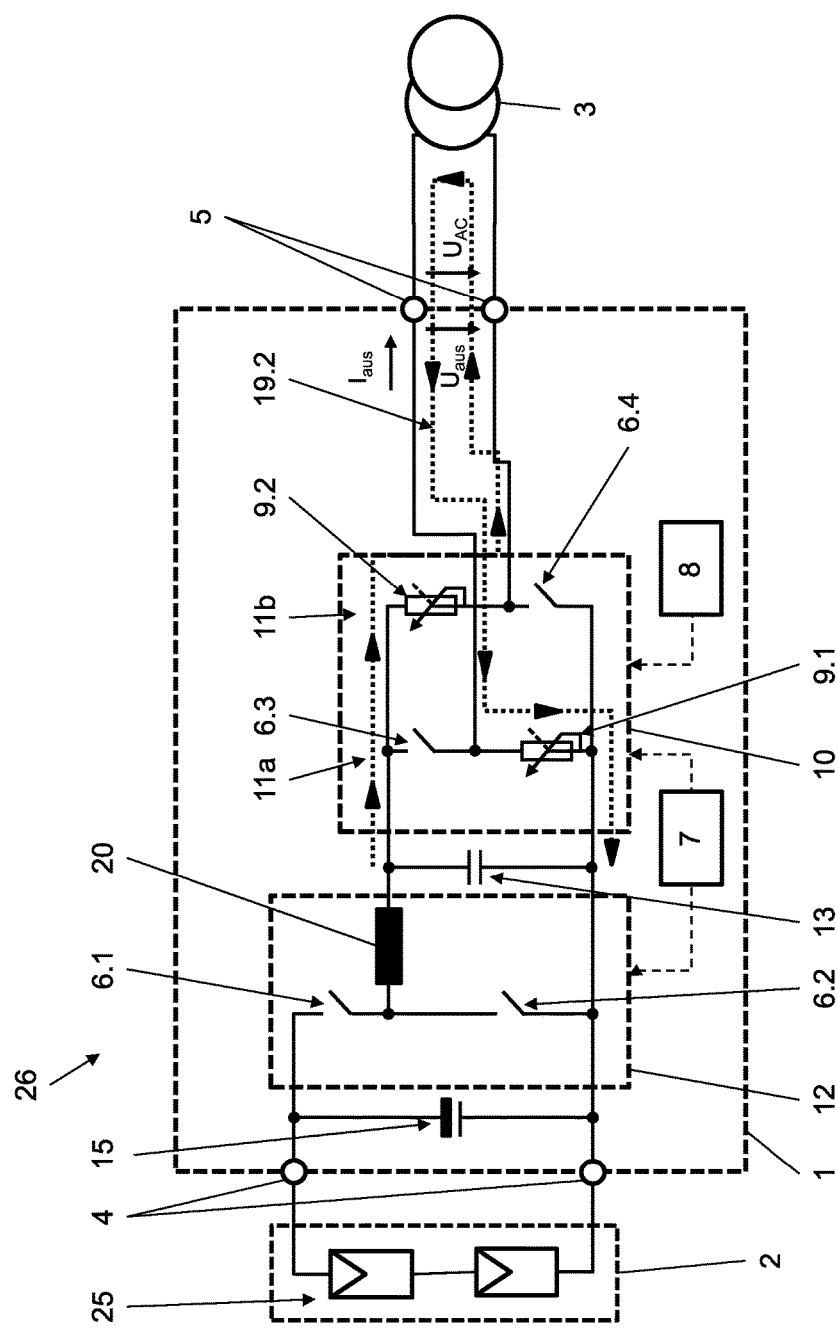
FIG. 2b illustrates a PV installation from FIG. 2a with a current profile for the current to be supplied at another time.

FIG. 2a and FIG. 2b illustrate current paths for the current ($I_{out}$) to be supplied using the example of an inverter (1) in a second embodiment for two different times. In the second embodiment of the inverter (1), the DC/DC converter (12) of the switching network (6) is embodied as a step-down converter with digitally operated semiconductor switches (6.1, 6.2) and an inductance (20). The DC/AC converter (10) comprises two half-bridges (11a, 11b), each having two semiconductor switches. In this embodiment of the inverter (1), no passive filter (14) is outlined upstream of the AC output (5) of the inverter (1). However, it may likewise be present as an additional optional assembly.

At the time outlined in FIG. 2a, an upper semiconductor switch of a first half-bridge (11a) and a lower semiconductor switch of a second half-bridge (11b) are operated as first linearly operated semiconductor switch (9.1) and second linearly operated semiconductor switch (9.2) in a linear mode with a variable ohmic resistance between the load connections of the switches. For this purpose, the relevant semiconductor switches are denoted using the symbol for a variable resistor. A lower semiconductor switch of the first half-bridge (11a) and an upper semiconductor switch of the second half-bridge (11b) act as a third digitally operated semiconductor switch (6.3) and as a fourth digitally operated semiconductor switch (6.4), respectively, and are actuated by means of the digital control unit (7) using a digital switching pattern. They are open at the time depicted in FIG. 2a. For the current ($I_{out}$) to be supplied, a current path (19.1) from the link circuit (13) via the first linearly operated semiconductor switch (9.1), the AC output (5), the AC mains (3), the second linearly operated semiconductor switch (9.2) back to the link circuit (13) is obtained. The corresponding current path (19.1) for the current ($I_{out}$) to be supplied is illustrated schematically in FIG. 2a.

FIG. 2b depicts a current profile for the current ($I_{out}$) to be supplied at a later time. At this time, the upper semiconductor switch of the first half-bridge (11a) and the lower semiconductor switch of the second half-bridge (11b) are operated as third digitally operated semiconductor switch (6.3) and as fourth digitally operated semiconductor switch (6.4), respectively. The digitally operated semiconductor switches (6.3, 6.4) are open at the time depicted in FIG. 2b. At this time, the lower semiconductor switch of the first half-bridge (11a) and the upper semiconductor switch of the second half-bridge (11b) operate as first linearly operated semiconductor switch (9.1) and as second linearly operated semiconductor switch (9.2), respectively.

In the example depicted, the roles of the digitally operated (6.3, 6.4) and linearly operated semiconductor switches (9.1, 9.2) have therefore been reversed. The semiconductor switches (6.3, 6.4) operated digitally at a previous time as shown in FIG. 2a act as linearly operated semiconductor switches (9.1, 9.2) at the later time depicted in FIG. 2b, and vice versa. The digitally operated semiconductor switches (6.3, 6.4) thus do not have to be operated digitally at all times, but rather can be operated digitally during a first period of time and linearly during a second period of time. The same thus also applies to the linearly operated semiconductor switches (9.1, 9.2).

For the current ($I_{out}$) to be supplied, a current path (19.2) from the link circuit (13) via the second linearly operated semiconductor switch (9.2), the AC output (5), the AC mains (3), the first linearly operated semiconductor switch (9.1) back to the link circuit (13) is obtained at the second time. The corresponding current path (19.2) for the current ($I_{out}$) to be supplied is illustrated schematically in FIG. 2b.

In FIGS. 2a and 2b the semiconductor switches operated in a linear mode are arranged within the current paths 19.1, 19.2, through which current paths 19.1, 19.2 the current ($I_{out}$) to be supplied to the AC-mains 3 is flowing. Therefore the current $I_{out}$ to be supplied also flows through the respective linearly operated semiconductor switches 9.1, 9.2. Within the current paths 19.1, 19.2 the semiconductor switches are conducted in series relative to each other. Therefore the voltage drop ($U_{out,lin}$) is generated collectively by the first 9.1 and the second semiconductor switch 9.2 operated in linear mode. Via a concurrent or rather synchronous variation of the ohmic resistances of the first 9.1 and the second linearly operated semiconductor switch 9.2 a differential-mode interference signal that is superposed in the current ($I_{out}$) to be supplied can be selectively manipulated, or even selectively be reduced. Accordingly, a common-mode interference signal overlaid on the current ($I_{out}$) to be supplied can be selectively manipulated, or even selectively reduced, by a concurrent but inverse variation of the ohmic resistances of the first 9.1 and the second linearly operated semiconductor switch 9.2.

FIGS. 3a, 3b, 3c, 3d each show part of the switching network (6) using the example of different embodiments of the inverter (1) according to the disclosure. They each depict the DC/AC converter (10) as part of the switching network (6) of semiconductor switches (6.1-6.n, 9.1, 9.2). The input side of the DC/AC converter (10) is connected either to the input capacitance (15) or to the DC input (4) directly. Equally, it is possible for the DC/AC converter (10) to be connected to the input capacitance (15) or the DC input (4) via the link circuit (13) and an upstream DC/DC converter (12) (not depicted in FIG. 3a-3d). The input capacitance (15) and/or the capacitance of the link circuit (13) ensures that the DC/AC converter (10) behaves and accordingly operates as a voltage-fed DC/AC converter (10) and the inverter (1) behaves and accordingly operates as a voltage-fed inverter. The DC/AC converter (10) is connected for control purposes both to the digital control unit (7) and to the linear control unit (8). Additionally, a boundary of the inverter (1) running through the AC output (5) is depicted in the form of a dashed line. The different embodiments of FIG. 3a-3d differ primarily in respect of a respective implementation of the DC/AC converter (10) and an arrangement of the linearly operated semiconductor switches (9.1, 9.2). For the sake of clarity, all of the semiconductor switches in FIGS. 3a-3d, and in FIGS. 2a and 2b, are depicted only in the form of switch symbols without parallel freewheeling diodes associated with each of the switches. However, even if the freewheeling diodes are not shown explicitly, the freewheeling diodes may nevertheless be present.

Figure 3A:
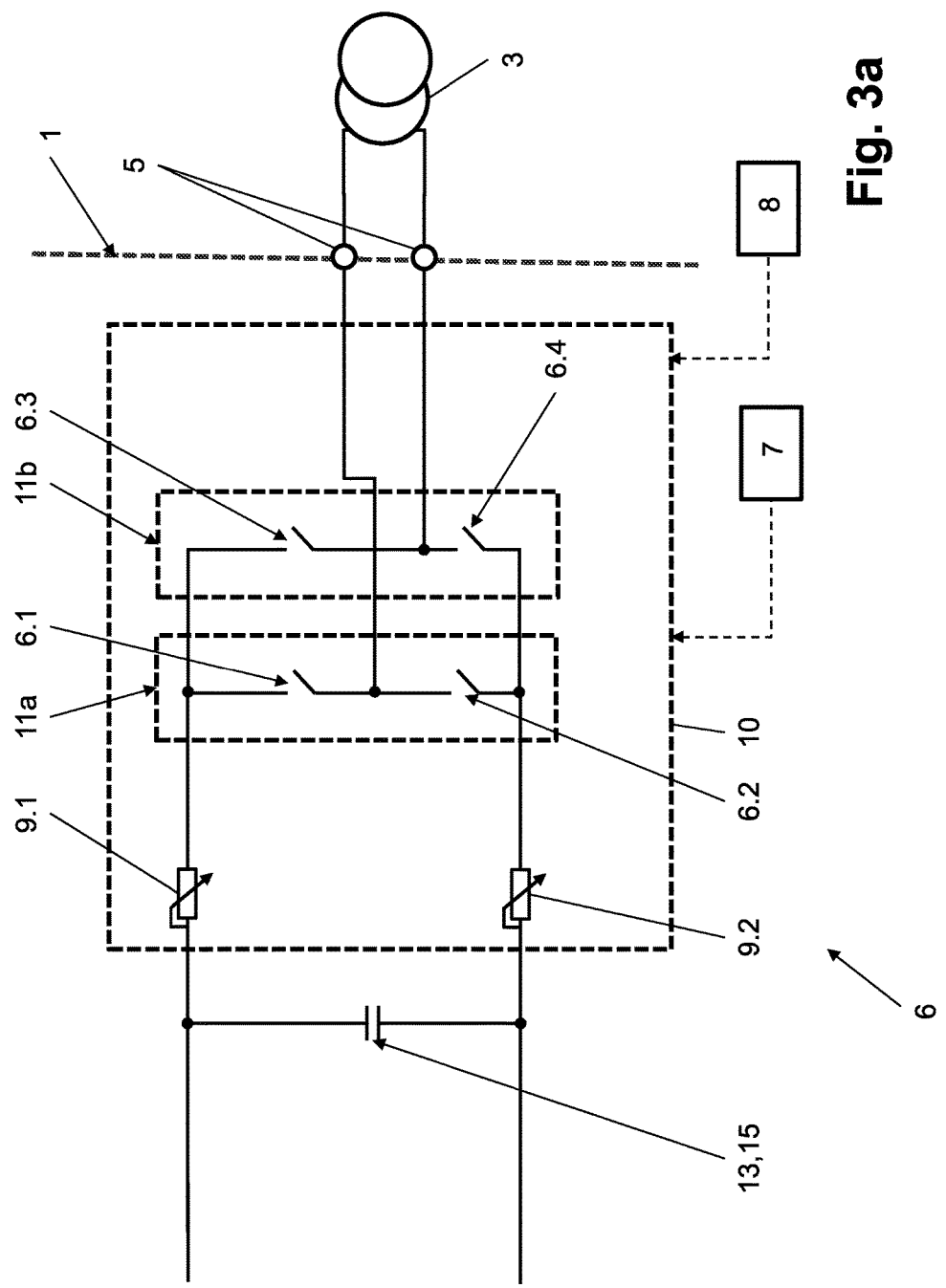
FIG. 3a shows part of the switching network using the example of a third embodiment of the inverter according to the disclosure.

In FIG. 3a, the DC/AC converter (10) comprises a first and a second half-bridge, each having two digitally operated semiconductor switches (6.1-6.4). The linearly operated semiconductor switches (9.1, 9.2) are arranged in a connecting line between the half-bridges (11a, 11b) and the link circuit (13), or between the half-bridges (11a, 11b) and the input capacitance (15).

Figure 3B:
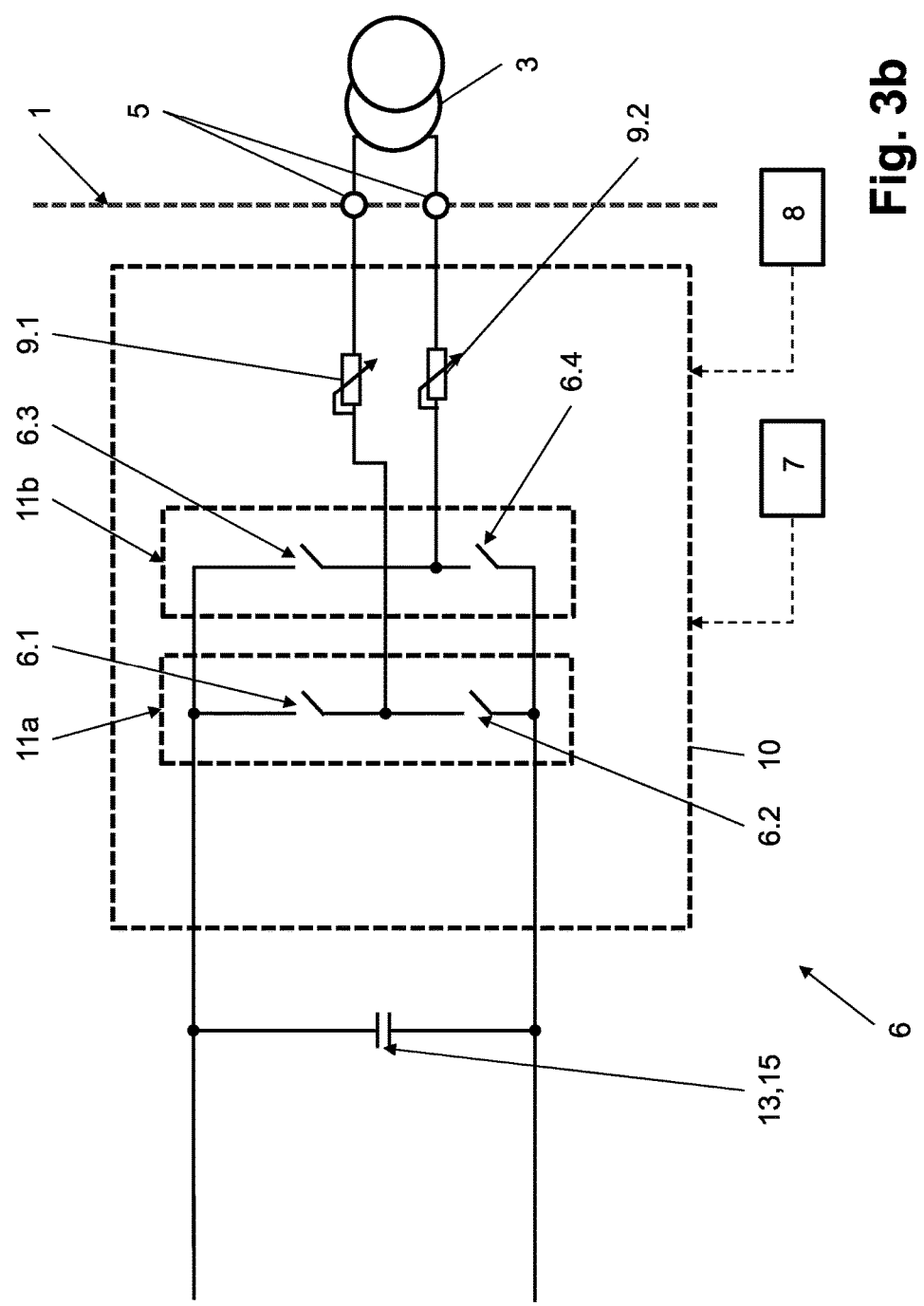
FIG. 3b shows part of the switching network using the example of a fourth embodiment of the inverter according to the disclosure.

In contrast to FIG. 3a, in FIG. 3b, the linearly operated semiconductor switches (9.1, 9.2) are each arranged in a connecting line for a centre tap of each half-bridge (11a, 11b) and a corresponding output connection of the AC output (5). The DC/AC converter (10) of the embodiment shown in FIG. 3c comprises merely one half-bridge (11a). The half-bridge (11a) is embodied in the form of a switchover bridge having two digitally operated semiconductor switches (6.1, 6.2). The DC/AC converter (10) additionally comprises merely one linearly operated semiconductor switch (9.1) that is arranged in a connecting line between the centre tap of the half-bridge (11a) and an output connection of the AC output (5). The link circuit (13) and/or the input capacitance (15) is embodied as a divided link circuit (13) or as a divided input capacitance (15) with a plurality—in this case: two—of series-connected capacitors. In this way, the divided link circuit (13) and/or the divided input capacitance (15) is capable of providing multiple voltage levels. The voltage levels can be explicitly accessed using a multilevel half-bridge as the half-bridge (11a) of the DC/AC converter (10), in which case the centre tap of the respective half-bridge (11a) can be connected to the individual voltage levels. A centre tap of the divided link circuit (13) or of the divided input capacitance (15) is connected to another output connection of the AC output (5) in FIG. 3c.

Figure 3C:
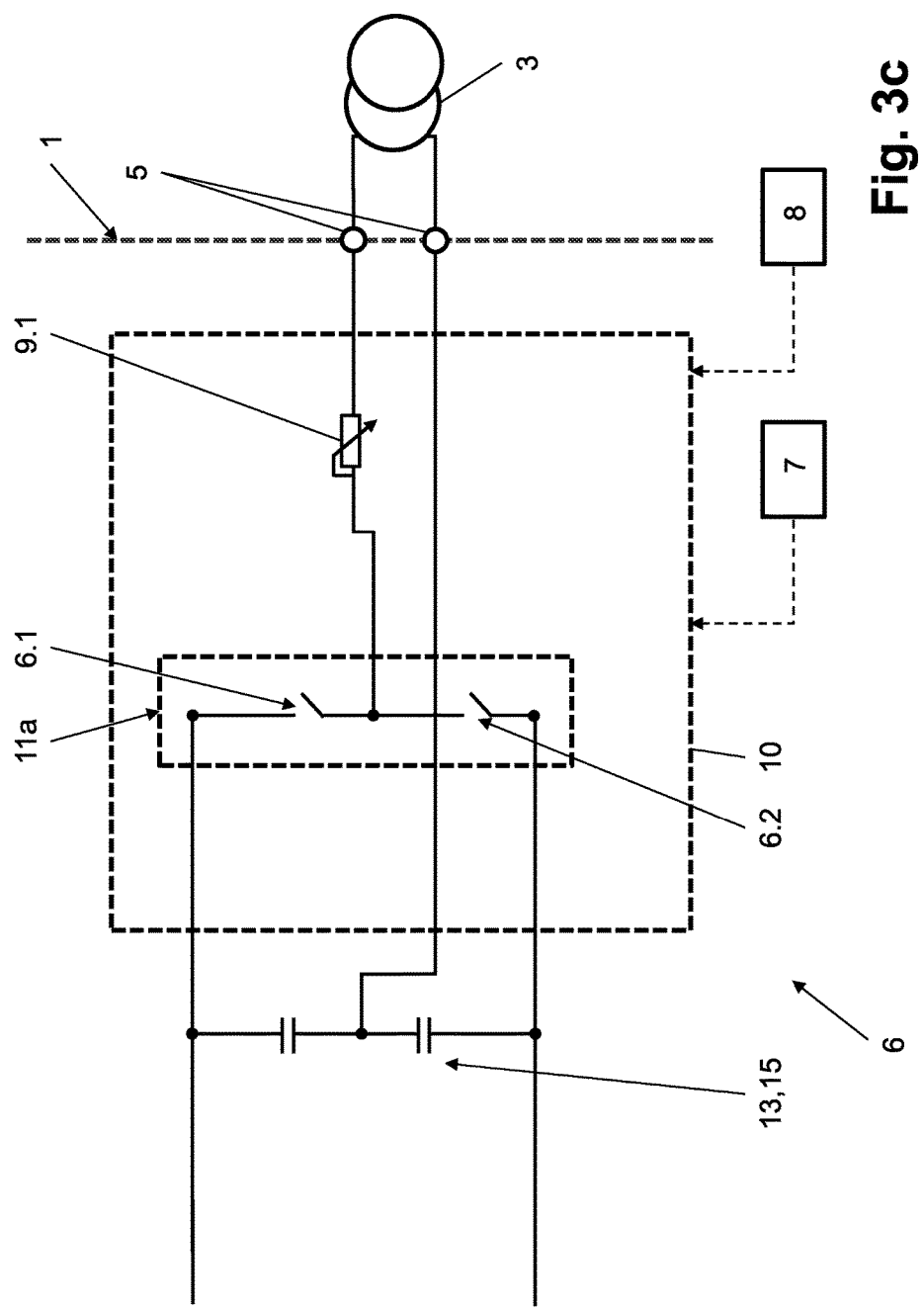
FIG. 3c shows part of the switching network using the example of a fifth embodiment of the inverter according to the disclosure.
Figure 3D:
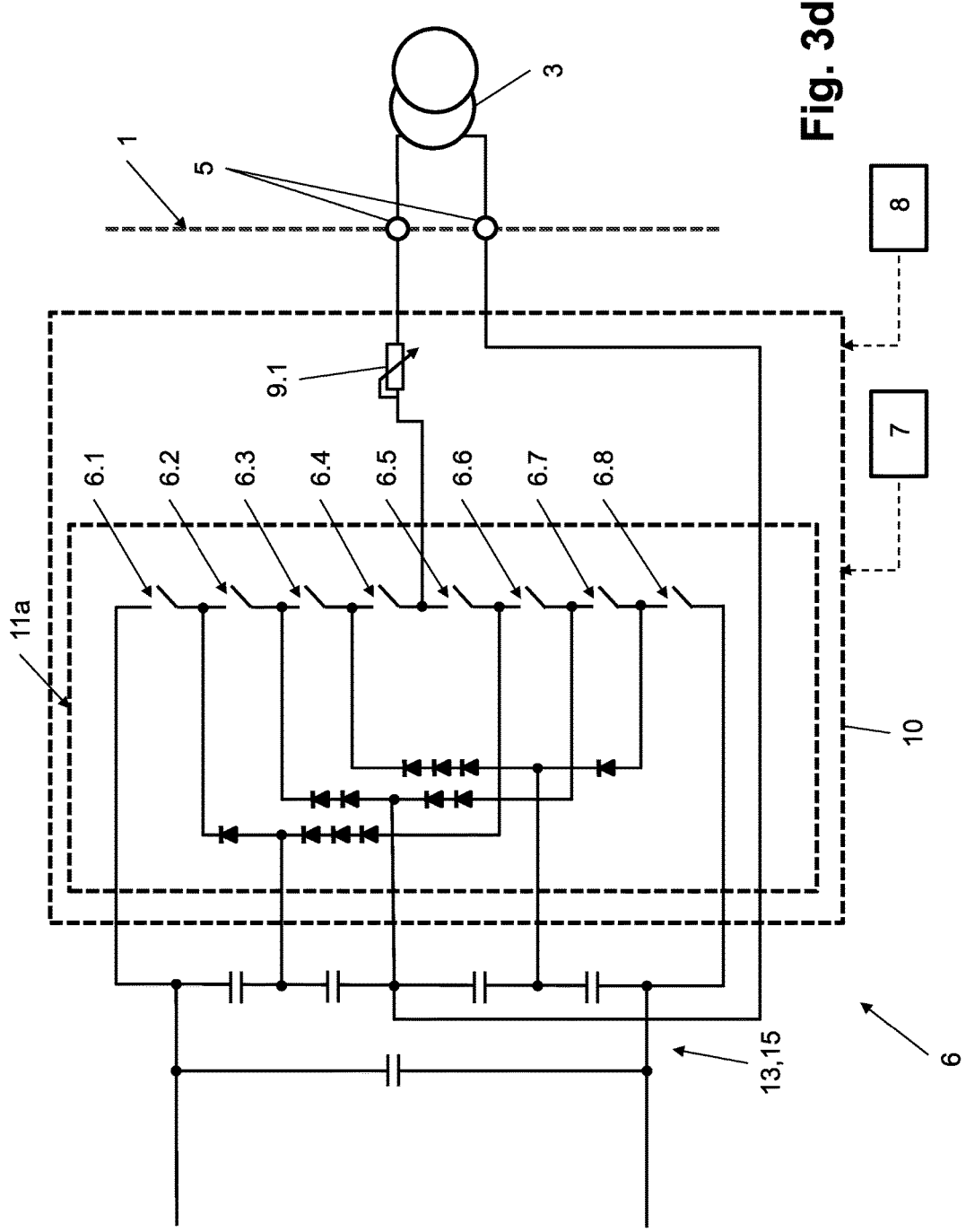
FIG. 3d shows part of the switching network using the example of a sixth embodiment of the inverter according to the disclosure.

The DC/AC converter (10) of the embodiment shown in FIG. 3d has, similarly to the embodiment shown in FIG. 3c, a half-bridge (11a) that is embodied as a multilevel half-bridge. The half-bridge (11a) has a total of eight digitally operated semiconductor switches (6.1-6.8). In conjunction with the divided link circuit (13) or the input capacitance (15) embodied in divided fashion, the half-bridge is capable of connecting a total of five voltage levels to a centre tap associated with it. The centre tap of the half-bridge (11a) is connected to an output connection of the AC output (5) via a linearly operated semiconductor switch (9.1). The further output connection of the AC output (5) is connected to a centre of the divided link circuit (13) or the divided input capacitance (15).

As an alternative to the merely one depicted half-bridge (11a), the DC/AC converter (10) in the embodiments shown in FIG. 3c and FIG. 3d can also have multiple half-bridges, particularly two half-bridges (11a, 11b). In the latter case, both output connections are each connected to a centre tap of one of the half-bridges (11a, 11b). The divided link circuit (13) and/or the divided input capacitance (15) can have a different number from the depicted number of series-connected capacitors. Accordingly, the multilevel half-bridge or the multilevel half-bridges may also be designed to connect a different number from the depicted number of voltage levels to the respective centre tap. Equally, as an alternative to the one linearly operated semiconductor switch (9.1), there may also be multiple linearly operated semiconductor switches. As such, e.g. additionally, a second linearly operated semiconductor switch (9.2) may be arranged in a connection between the centre of the divided link circuit (13) and/or the divided input capacitance (15). Equally, it may be arranged in a connection between a centre tap of the second half-bridge (11b) and the output connection of the AC output (5). In FIGS. 3a-3d, passive filters 14 between the DC/AC converter 10 and the AC output of the inverter 1 are not depicted explicitly, for reasons of clarity. Nevertheless, they may still be present as additional assemblies, however.

Figure 4A:
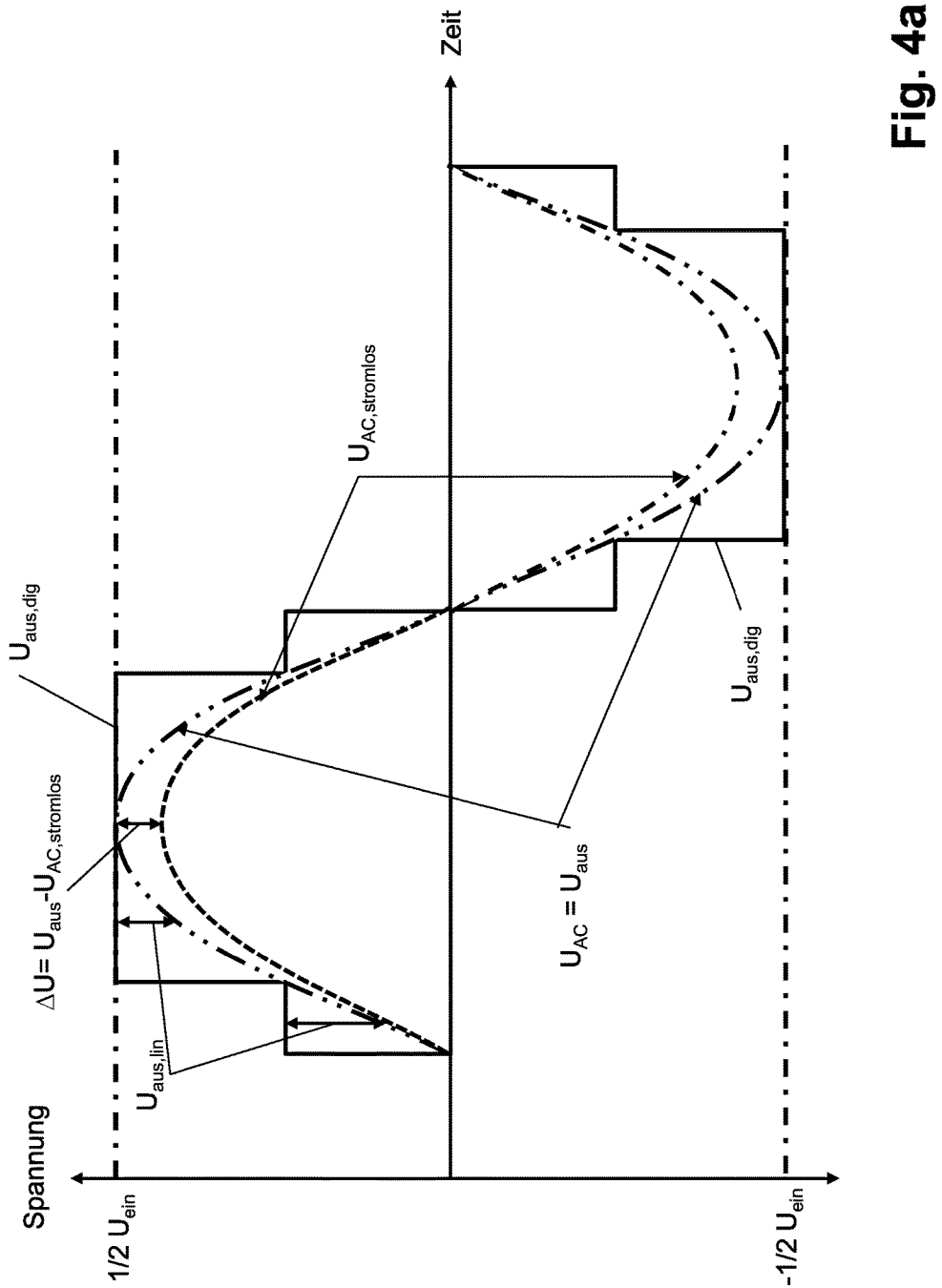
FIG. 4a shows voltage/time profiles for different voltages using the example of the embodiment of the inverter according to the disclosure shown in FIG. 3d.

FIG. 4a shows voltage/time profiles for different voltages using the example of the embodiment of the inverter according to the disclosure shown in FIG. 3d. For the description that follows, it is assumed that the DC/AC converter (10) of the switching network (6) is connected directly to the DC input (4) or the divided input capacitance (15).

What is depicted specifically is a profile of the input voltage ($U_{in}$), which is measured at the DC input (4) or at the input capacitance (15), in the form of a dash-dot line. The input voltage ($U_{in}$) is connected to the input of the DC/AC converter (10) or the relevant half-bridge (11a). On account of a multilevel topology, the half-bridge (11a) is capable of connecting discrete voltage levels to the centre tap of the bridge. Appropriate actuation of the digitally operated semiconductor switches (6.1-6.8) by means of the digital control unit (7) generates the first output voltage ($U_{out,dig}$) on the centre tap of the half-bridge (11a). In this case, the first output voltage ($U_{out,dig}$) is obtained solely on the basis of the switching behaviour of the digitally operated switches (6.1-6.8) of the half-bridge (11a) and has the staircase-shaped profile depicted in FIG. 4a. The first output voltage ($U_{out,dig}$) can be observed in concrete terms at the centre tap of the half-bridge (11a). Equally, it can, in principle, also be observed at the AC output (5) of the inverter (1), namely if all of the linearly operated semiconductor switches (9.1, 9.2) were operated not in the envisaged linear mode but instead in completely closed fashion. In addition, the sinusoidal profile of the AC voltage ($U_{AC}$) in the AC mains (3) is depicted in dashed form. In this case, the AC voltage in the AC mains (3) means particularly a voltage profile ($U_{AC}$) measured directly at the source of the AC mains (3)—for example a local mains transformer associated with the section of the AC mains (3). In a zero-current state of a connecting line between the inverter (1) and the local mains transformer, this profile is observable to the greatest extent also at the AC output (5) of the inverter (1). The current ($I_{out}$) to be supplied to the AC mains (3) flows through the at least one linearly operated semiconductor switch (9.1, 9.2) that is actuated by means of the linear control unit (8) and operated in a linear mode. The at least one linearly operated semiconductor switch (9.1, 9.2) is actuated by the linear control unit (8) such that the linearly operated semiconductor switch has a voltage drop ($U_{out,lin}$) produced across it that, in combination with the first output voltage ($U_{out,dig}$), likewise has a sinusoidal profile. The voltage drop ($U_{out,lin}$) is depicted as a double-headed arrow in FIG. 4a by way of example for two particular times in the time profile. The combination of the voltage drop ($U_{out,lin}$) and the first output voltage ($U_{out,dig}$) is connected as an output voltage ($U_{out}$) to the AC output (5) of the inverter (1). The sinusoidal profile of the output voltage ($U_{out}$) corresponds, in the event of hard coupling to a line arm end connected to the AC output, to the AC voltage ($U_{AC}$) of the AC mains (3) that prevails at the line arm end. The hard coupling means that the inverter is capable of changing the AC voltage ($U_{AC}$) slightly at the line arm end of the AC mains. Additionally, a sinusoidal AC voltage ($U_{AC,zero\ current}$) of the AC mains (3) that characterizes a supply-free or zero-current state ($I_{out}=0$) is also depicted schematically. In this case, the AC voltage ($U_{AC,zero\ current}$) characterizing the zero-current state can be detected e.g. when no current ($I_{out}$) is supplied to the AC mains (3) or an AC relay (16) of the inverter (1) is open. A difference between the output voltage ($U_{out}$), or the AC voltage ($U_{AC}$) of the AC mains (3) modified by means of the output voltage ($U_{out}$), and the AC voltage ($U_{AC,zero\ current}$) characterizing the zero-current state is a driving force for the current ($I_{out}$) to be supplied. The sinusoidal shape of the output voltage ($U_{out}$) and the AC voltage ($U_{AC,zero\ current}$) characterizing the zero-current state in the AC mains (3) means that the difference therein $\Delta U = U_{out} - U_{AC,zero\ current}$ is also highly sinusoidal. The difference $\Delta U = U_{out} - U_{AC,zero\ current}$ is depicted as a double-headed arrow in FIG. 4a for a particular time in the time profile. Since this is the driving force for the current ($I_{out}$) to be supplied, the current ($I_{out}$) to be supplied is itself also highly sinusoidal and to the greatest extent free of undesirable interference current components or harmonics.

Figure 4B:
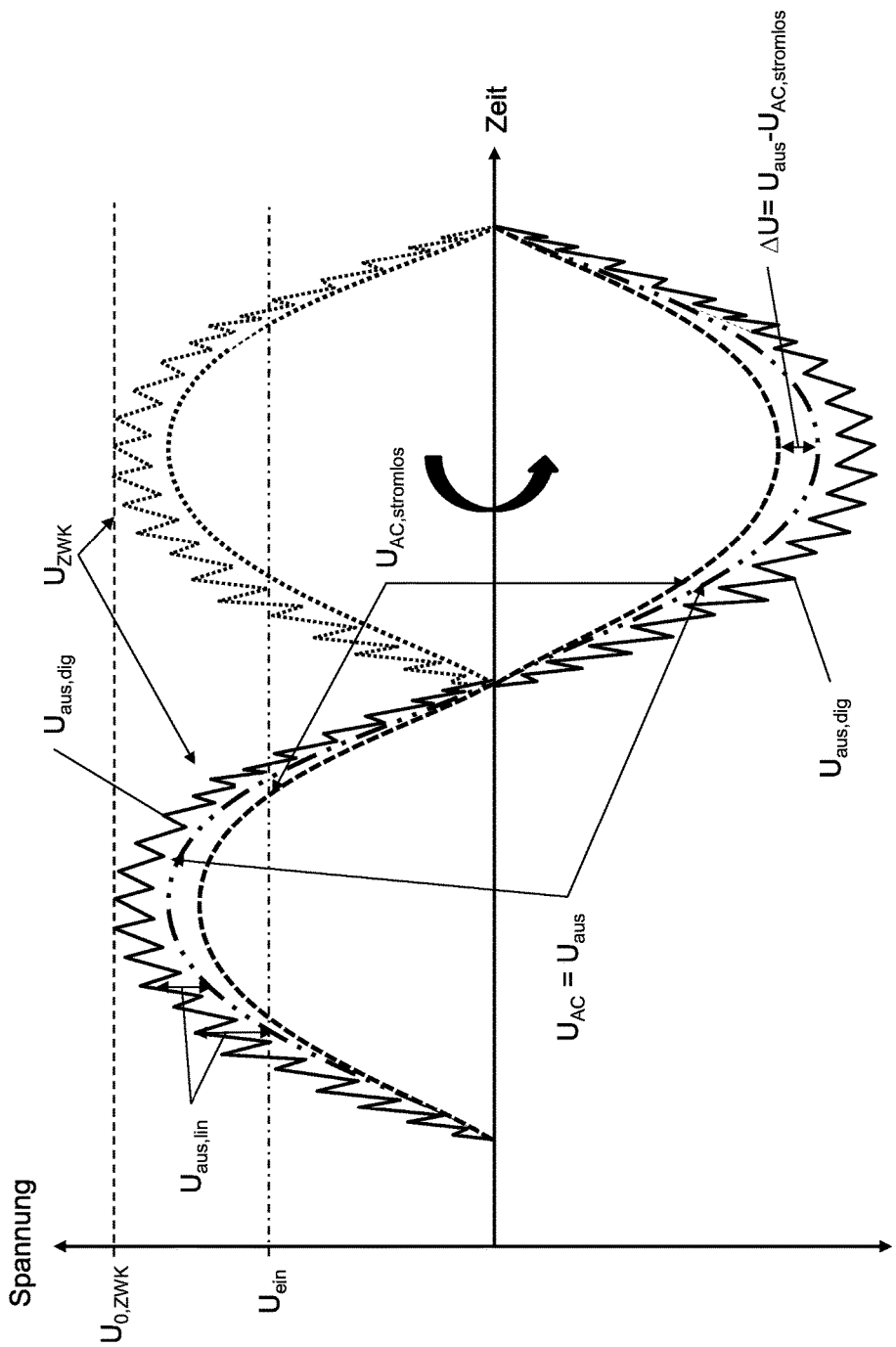
FIG. 4b shows voltage/time profiles for different voltages using the example of the embodiment of the inverter according to the disclosure shown in FIG. 1b.

FIG. 4b shows voltage/time profiles for different voltages using the example of the embodiment of the inverter (1) according to the disclosure shown in FIG. 1b. In this case, the DC/AC converter (10) of the switching network (6) is connected to the DC input (4) or the input capacitance (15) via the link circuit (13) and an upstream DC/DC converter (12). The DC/DC converter (12) is embodied as a combined step-up/step-down converter in this case. The DC/AC converter has two half-bridges (11a, 11b) and is designed to operate as a polarity reverser. By way of example, it should be assumed that the DC/AC converter (10) has two linearly operated semiconductor switches (9.1, 9.2), with in each case, one linearly operated semiconductor switch being arranged in each connecting line between the half-bridges and the link circuit (13).

The DC input (4) of the inverter (1) or of the input capacitance (15) has the input voltage ($U_{in}$) applied to it as a DC voltage. The input voltage ($U_{in}$) is depicted as a dot-dash line in FIG. 4b. The DC/DC converter (12) converts the input voltage ($U_{in}$) into a half-cycle-sinusoidally pulsed DC voltage that is transferred to the link circuit (13). The voltage ($U_{LNK}$) applied to the link circuit (13) is depicted in FIG. 4b by way of example in the form of two sinusoidal half cycles containing a voltage ripple for a period duration of the frequency in the AC mains (3). In time periods in which the input voltage ($U_{in}$) is lower than the voltage ($U_{LNK}$) applied to the link circuit (13), the DC/DC converter (12) operates as a step-up converter, and it operates as a step-down converter in the other time periods. The DC/AC converter (10) operates as a polarity reverser and switches over every second instance of the sinusoidal half cycles appearing in the link circuit (13) by means of appropriate digitally operated switches (6.j+1-6.n). This is symbolized in FIG. 4b by the curved arrow in conjunction with mirroring of the relevant sinusoidal half cycle on the time axis. The voltage ripple that is still overlaid on the first output voltage ($U_{out,dig}$) is removed by means of appropriate actuation of the linearly operated semiconductor switches (9.1, 9.2) by using the latter, by virtue of actuation by means of the linear control unit (8), to produce a voltage drop ($U_{out,lin}$) in total, so that the combination of the voltage drop ($U_{out,lin}$) with the first output voltage ($U_{out,dig}$) has a highly sinusoidal profile. FIG. 4b illustrates the level of the voltage drop ($U_{out,lin}$) as a double-headed arrow by way of example for two particular times.

The sinusoidal profile of the combination of voltage drop ($U_{out,lin}$) and first output voltage ($U_{out,dig}$) is depicted in the form of a solid line in FIG. 4b as an output voltage ($U_{out}$). The sinusoidal output voltage ($U_{out}$) is transferred to the AC output (5) of the inverter (1) and is hard-coupled to the AC voltage ($U_{AC}$) in the AC mains (3), at least with respect to an AC voltage ($U_{AC}$) prevailing at a line arm end of the AC mains (3). In addition, a sinusoidal AC voltage ($U_{AC,zero\ current}$) of the AC mains (3) that characterizes a supply-free or zero-current state ($I_{out}=0$) is depicted in the form of a dashed curve in this case too. The difference $\Delta U = U_{out} - U_{AC,zero\ current}$ in the output voltage ($U_{out}$) or the AC voltage ($U_{AC}$) of the AC mains (3) and the AC voltage ($U_{AC,zero\ current}$) characterizing the zero-current state of the line arm at this time in the AC mains (3) is the driving force for the current ($I_{out}$) to be supplied. FIG. 4b illustrates the difference $\Delta U = U_{out} - U_{AC,zero\ current}$ as a double-headed arrow by way of example for a particular time. Similarly to FIG. 4a, the difference $U_{out} - U_{AC,zero\ current}$ is also highly sinusoidal, which is why the current ($I_{out}$) to be supplied is also highly sinusoidal and to the greatest extent free of undesirable interference current components.

Figure 5A:
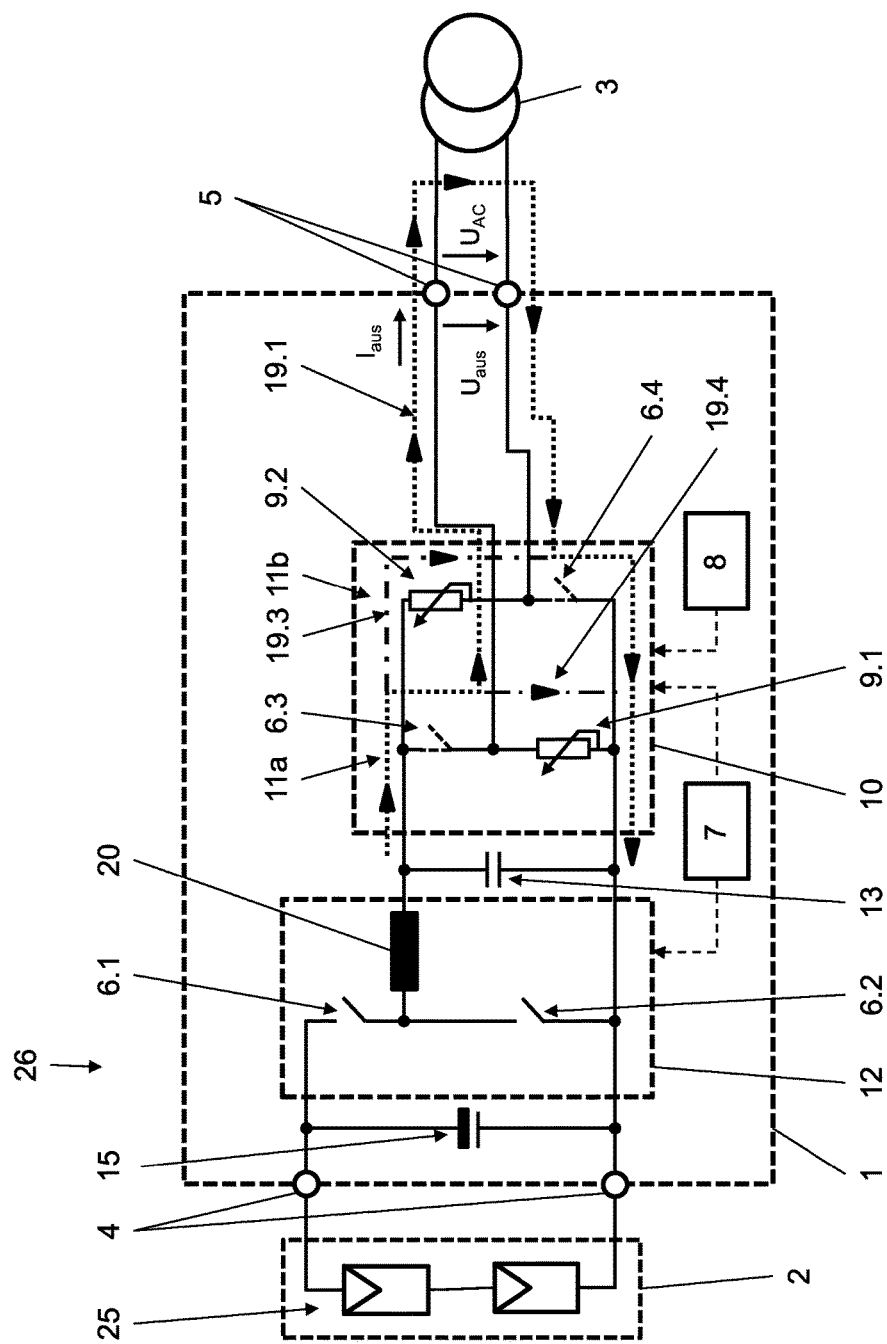
FIG. 5a shows a PV-installation with a current profile of the current to be supplied at a time in a seventh embodiment of the inverter.
Figure 5B:
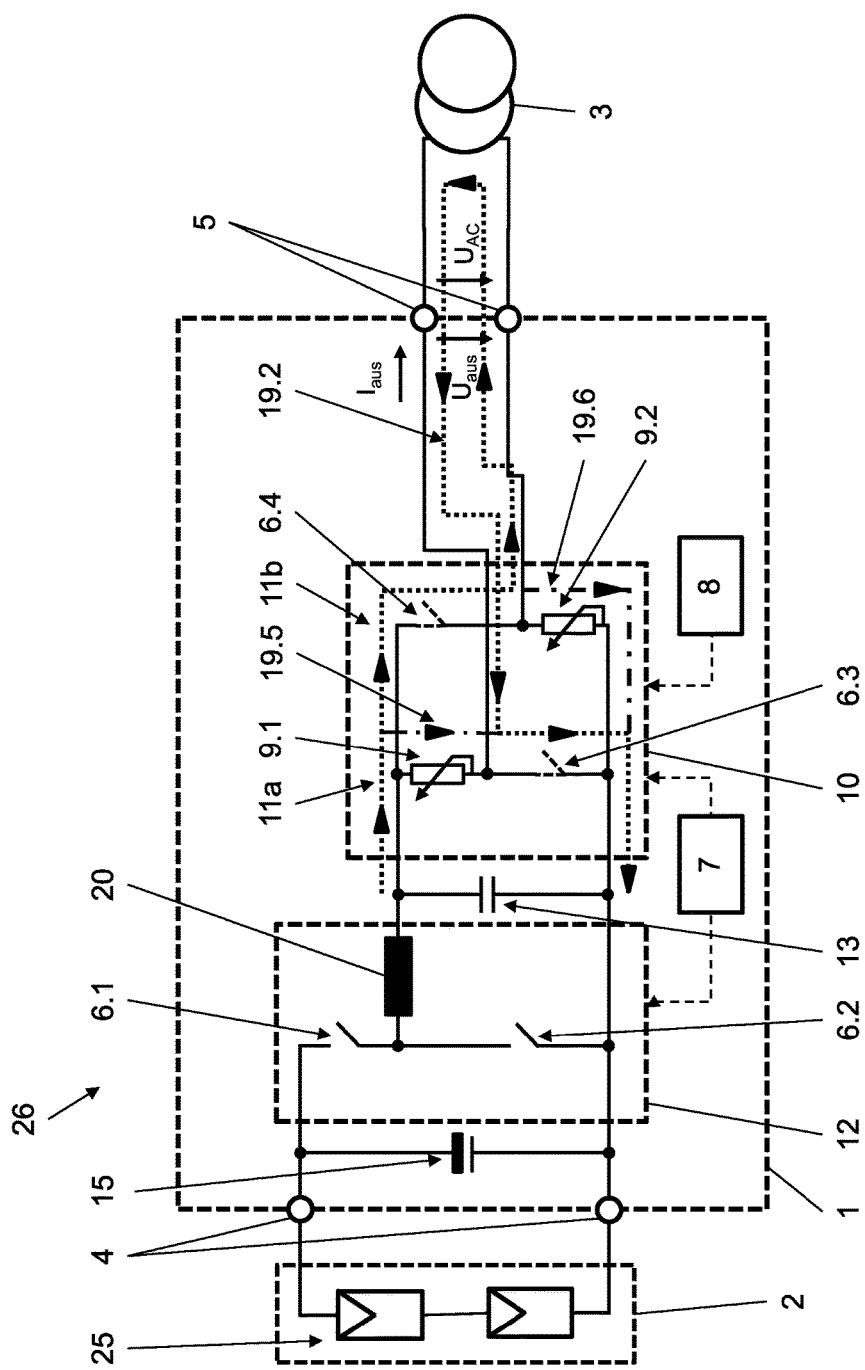
FIG. 5b illustrates a PV-installation with a current profile of the current to be supplied at another time in a seventh embodiment of the inverter.

FIGS. 5a and 5b illustrate current paths for the current to be supplied to the AC-mains using the example of an inverter (1) in a seventh embodiment for two different points in time. The seventh embodiment of the inverter (1) is similar to the second embodiment shown in FIGS. 2a and 2b. Therefore in the following only the differences to the second embodiment shown in FIGS. 2a and 2b are explained. At the point in time depicted in FIG. 5a an upper semiconductor switch of the left half-bridge 11a is acting as third digitally operated semiconductor switch 6.3, whereas a lower semiconductor switch of the right half-bridge 11b is acting as fourth digitally operated semiconductor switch 6.4. Both digitally operated semiconductor switches 6.3, 6.4 are closed. Additionally a lower semiconductor switch of the left half-bridge 11a and an upper semiconductor switch of the right half bridge 11b are acting as first linearly and second linearly operated semiconductor switches 9.1 and 9.2, respectively. The semiconductor switches operated in linear mode are arranged aside a current path 19.1 depicted as a dotted line, through which current path 19.1 the current ($I_{out}$) to be supplied to the AC mains is flowing. Starting from a substantially open state of the linearly operated semiconductor switches 9.1, 9.2 are somewhat closed and via this moved to a state comprising a somewhat lower ohmic resistance between their load connections. Due to this a fraction of the current ($I_{out}$) to be supplied is bypassed along current paths 19.3, 19.4 illustrated as chain dotted line. That respective current fraction accordingly does not flow through the AC-output 5 of the inverter 1 and is therefore not supplied to the AC-mains 3.

At the point in time depicted in FIG. 5b the semiconductor switches operated in linear mode and the semiconductor switches operated in digital mode are interchanged. Now a lower semiconductor switch of the left half-bridge 11a acts as third 6.3, and an upper semiconductor switch of the right half-bridge 11b acts as fourth semiconductor switch 6.4 operated in a digital mode. Both digitally operated semiconductor switches 6.3, 6.4 are closed at the point in time depicted in FIG. 5b. Furthermore, an upper semiconductor switch of the left half-bridge 11a acts as first linearly operated semiconductor switch 9.1, and a lower semiconductor switch of the right half-bridge 11b acts as second linearly operated semiconductor switch 9.2. Also here, the linearly operated semiconductor switches 9.1, 9.2 are arranged aside a current path 19.2, in which current path 19.2 the current $I_{out}$ to be supplied to the AC-mains 3 is flowing and which current path 19.2 is depicted in FIG. 5*b* as a dotted line. Starting from an open state of the linearly operated semiconductor switches 9.1, 9.2 the semiconductor switches 9.1, 9.2 operated in linear mode are somewhat closed and therefore their ohmic resistance between their load connections is somewhat lowered. Due to this a fraction of the current (Iout) to be supplied is directed along current paths 19.3, 19.4 depicted as chain dotted lines through the linearly operated semiconductor switches 9.1, 9.2. Again, that current fraction does not flow through the AC-output 5 of the inverter 1 and therefore is not supplied to the AC-mains.

Dependent on how the ohmic resistances of the linearly operated semiconductor switches 9.1, 9.2 are varied relative to each other, either a differential-mode interference signal or common-mode interference signal superposed on the current $I_{out}$ to be supplied to the AC-mains 3 can be selectively manipulated, or even reduced. In particular, a concordant or rather synchronous variation of the ohmic resistances of the first 9.1 and the second linearly operated semiconductor switch 9.2 relative to each other leads to a selective manipulation of a differential-mode interference signal. Furthermore, an inverse variation of the ohmic resistances of first 9.1 and second 9.2 linearly operated semiconductor switch 9.2 leads to a selective manipulation, or even a reduction, of a common mode interference signal.

What is claimed:

1. An inverter for supplying a power provided as a DC voltage at a DC input to an AC mains connectable to an AC output, comprising:
    a switching network comprising a plurality of semiconductor switches comprising a first set of one or more semiconductor switches to be operated digitally and a second set of one or more semiconductor switches to be operated linearly;
    a digital control unit configured to produce a digital switching pattern for the first set of one or more semiconductor switches of the switching network that produce a first output voltage, wherein the first output voltage comprises a ripple voltage having an interference current associated therewith; and
    a linear control unit configured to produce signals for actuating the second set of one or more semiconductor switches of the switching network in a linear mode, wherein the linear control unit is configured to produce a voltage drop across at least one of the one or more linearly operated semiconductor switches so that a combination of the first output voltage and the voltage drop has a sinusoidal shape or a half-cycle-sinusoidal shape, and
    wherein the linear control circuit is configured to control one or more of the second set of switches to at least partially remove the interference current by generating a voltage drop across the second set of switches to at least partially counteract the ripple voltage, wherein the voltage drop has a power loss associated therewith.

2. The inverter according to claim 1, wherein the switching network comprises a DC/AC converter with at least one half-bridge.

3. The inverter according to claim 2, wherein the at least one half-bridge comprises a multilevel half-bridge.

4. The inverter according to claim 2, wherein the switching network comprises a DC/DC converter that is connected to the DC/AC converter via a link circuit.

5. The inverter according to claim 4, wherein the DC/DC converter contains the at least one linearly operated semiconductor switch in the second set.

6. The inverter according to claim 4, wherein the DC/DC converter is configured to produce a pulsed DC voltage, particularly a half-cycle-sinusoidal DC voltage, and wherein the DC/AC converter comprises a polarity reverser.

7. The inverter according to claim 2, wherein the DC/AC converter comprises at least one linearly operated semiconductor switch in the second set.

8. The inverter according to claim 1, wherein the at least one linearly operated semiconductor switch in the second set comprises a first and a second semiconductor switch operated in linear mode simultaneously.

9. The inverter according to claim 2, wherein the at least one linearly operated semiconductor switch in the second set
    is part of a connection between the half-bridges and the link circuit, or
    is part of a connection between a centre tap of the half-bridges and the AC output.

10. The inverter according to claim 1, wherein the at least one semiconductor switch in the second set operated in a linear mode is arranged in a current path in which the current to be supplied to the AC-mains is flowing.

11. The inverter according to claim 1, wherein the at least one semiconductor switch operated in a linear mode is arranged aside a current path, through which current path the current to be supplied to the AC-mains is flowing, and wherein the at least one semiconductor switch operated in the linear mode provides a current bypass relative to the AC-output of the inverter, so that the current flowing through the at least one semiconductor switch operated in the linear mode is bypassed away from the AC-output.

12. The inverter according to claim 1, wherein the at least one semiconductor switch operated in a linear mode comprises a bipolar transistor, an Insulated Gate Bipolar Transistor (IGBT) or a Metal Oxide Semiconductor Field Effect Transistor (MOSFET).

13. The inverter according to claim 1, wherein the inverter comprises no passive filter between the DC/AC converter and the AC output.

14. A control method for an inverter for supplying a power provided as a DC voltage at a DC input to an AC mains connectable to an AC output, wherein the inverter comprises a switching network with a plurality of semiconductor switches comprising a first set of one or more semiconductor switches to be operated digitally and a second set of one or more semiconductor switches to be operated linearly, and a digital control unit for digitally operating the first set of semiconductor switches of the switching network, wherein the control method comprises:
    actuating the first set of semiconductor switches of the switching network using a digital switching pattern produced in the digital control unit, wherein the actuating of the first set of semiconductor switches generates a first output voltage, wherein the first output voltage comprises a ripple voltage having an interference current associated therewith,
    determining a difference between the first output voltage of the switching network, produced by the digital switching pattern, and an AC voltage of the AC mains, and
    producing a voltage drop across at least one of the one or more semiconductor switches in the second set of semiconductor switches operated in a linear mode, of the switching network, by actuating the at least one semiconductor switch in the second set operated in the linear mode using a linear control unit so that a combination of the first output voltage and the voltage drop has a sinusoidal shape or a half-cycle-sinusoidal shape, wherein the voltage drop across the second set of semiconductor switches at least partially counteracts the ripple voltage, wherein the voltage drop has a power loss associated therewith.

15. The control method according to claim 14, wherein the current to be supplied to the AC-mains is flowing through the at least one semiconductor switch of the second set operated in the linear mode.

16. The control method according to claim 14, wherein a current flowing through the at least one semiconductor switch operated in the linear mode is bypassed from and not flowing through the AC-output of the inverter.

17. The control method according to claim 14, wherein the at least one semiconductor switch operated in the linear mode comprises a first and a second semiconductor switch operated in a linear mode concurrently.

18. The control method according to claim 17, wherein ohmic resistances of the first and the second linearly operated semiconductor switch are varied synchronously with respect to one another over time in order to reduce a differential-mode interference signal that is overlaid on a current to be supplied to the AC mains.

19. The control method according to claim 17, wherein ohmic resistances of the first and the second linearly operated semiconductor switch are varied inversely with respect to one another over time in order to reduce a common-mode interference signal that is overlaid on a current to be supplied to the AC-mains.

20. The control method according to claim 14, wherein a current amplitude of the current to be supplied to the AC mains is controlled by means of a voltage amplitude of a pulsed DC voltage produced by a DC/DC converter across a link circuit of the inverter, particularly a half-cycle-sinusoidal DC voltage.

21. A photovoltaic (PV) installation (26) comprising an inverter according to claim 1 designed as a PV inverter, and a photovoltaic generator connected to the DC input of the inverter.

22. The inverter according to claim 1, wherein the at least one linearly operated semiconductor switch comprises a first and a second semiconductor switch in the second set operated in the linear mode, wherein the voltage drop is formed by the first and the second semiconductor switch in the second set in the linear mode collectively.

* * * * *